US012419807B2

(12) United States Patent
Brandenburger et al.

(10) Patent No.: US 12,419,807 B2
(45) Date of Patent: Sep. 23, 2025

(54) MEDICAL PACKAGING IN THE FORM OF AN INFUSION BAG AND METHOD FOR TRANSFERRING LIQUID FROM A VIAL TO AN INFUSION BAG

(71) Applicant: Fresenius Kabi Deutschland GmbH, Bad Homburg (DE)

(72) Inventors: Torsten Brandenburger, Friedberg (DE); Janine Seidel, Friedberg (DE); Christian Nitsche, Friedberg (DE); Alexander Degen, Friedberg (DE); Junda Liu, Friedberg (DE); Ismael Rahimy, Friedberg (DE); Beatrix Heuel-Hommen, Friedberg (DE)

(73) Assignee: Fresenius Kabi Deutschland GmbH, Bad Homburg (DE)

( * ) Notice: Subject to any disclaimer, the term of this patent is extended or adjusted under 35 U.S.C. 154(b) by 946 days.

(21) Appl. No.: 17/615,636

(22) PCT Filed: Jun. 8, 2020

(86) PCT No.: PCT/EP2020/065816

§ 371 (c)(1),
(2) Date: Dec. 1, 2021

(87) PCT Pub. No.: WO2020/245455

PCT Pub. Date: Dec. 10, 2020

(65) Prior Publication Data

US 2022/0370290 A1 Nov. 24, 2022

(30) Foreign Application Priority Data

Jun. 6, 2019 (EP) ..................................... 19178711

(51) Int. Cl.
*A61J 1/20* (2006.01)
*A61J 1/10* (2006.01)
(Continued)

(52) U.S. Cl.
CPC ............... *A61J 1/2055* (2015.05); *A61J 1/10* (2013.01); *A61J 1/1406* (2013.01); *A61J 1/18* (2013.01); *A61J 1/201* (2015.05); *A61J 1/2089* (2013.01)

(58) Field of Classification Search
None
See application file for complete search history.

(56) References Cited

U.S. PATENT DOCUMENTS 4,320,770 A * 3/1982 Etherington ........... A61B 5/153 222/548
4,735,608 A 4/1988 Sardam
(Continued)

FOREIGN PATENT DOCUMENTS

CN 1886295 A * 12/2006 ................ A61J 1/10
CN 104703574 A 6/2015
(Continued)

*Primary Examiner* — Ariana Zimbouski
(74) *Attorney, Agent, or Firm* — Blank Rome LLP

(57) ABSTRACT

The invention relates to a packaging in the form of an infusion bag, having a connector for a vial, said connector having a spike for piercing the septum of the vial to establish a fluid connection to the inner volume of the infusion bag. The spike is designed to be rotatable. When the vial is rotated, the spike is rotated and the fluid connection between the vial and the inner volume of the infusion bag is opened.

30 Claims, 35 Drawing Sheets

(51) Int. Cl.
*A61J 1/14* (2023.01)
*A61J 1/18* (2023.01)

(56) References Cited

U.S. PATENT DOCUMENTS

| | | | | |
|---|---|---|---|---|
| 4,759,756 | A | 7/1988 | Forman et al. | |
| 5,279,576 | A * | 1/1994 | Loo | A61J 1/2096 222/1 |
| 10,932,990 | B2 | 3/2021 | Spallek et al. | |
| 2003/0153895 | A1 * | 8/2003 | Leinsing | A61J 1/2089 604/403 |
| 2007/0299419 | A1 * | 12/2007 | Vancaillie | A61M 5/162 604/416 |
| 2008/0015496 | A1 * | 1/2008 | Hamedi-Sangsari | A61J 1/2089 604/82 |
| 2015/0297462 | A1 * | 10/2015 | Lev | A61J 1/201 604/407 |

FOREIGN PATENT DOCUMENTS

| | | | |
|---|---|---|---|
| DE | 3503460 | A1 | 9/1985 |
| EP | 1219283 | A2 | 7/2002 |
| KR | 10-2018-0030779 | | 3/2018 |
| WO | 84/04673 | A1 | 12/1984 |
| WO | 8601712 | A1 | 3/1986 |
| WO | 2007/149960 | A2 | 12/2007 |
| WO | 2014/033710 | A1 | 3/2014 |
| WO | 2016177383 | A1 | 11/2016 |

* cited by examiner

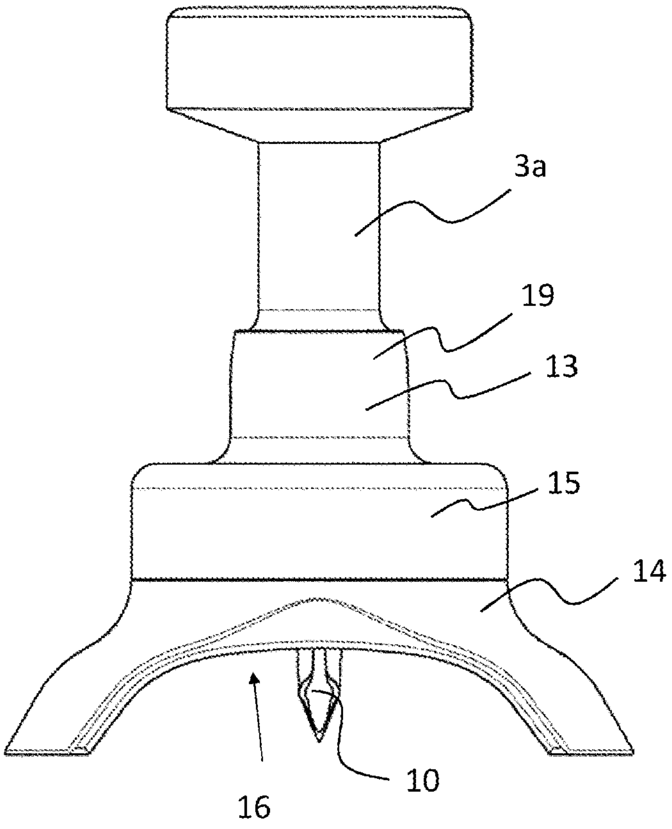
Fig. 3‘

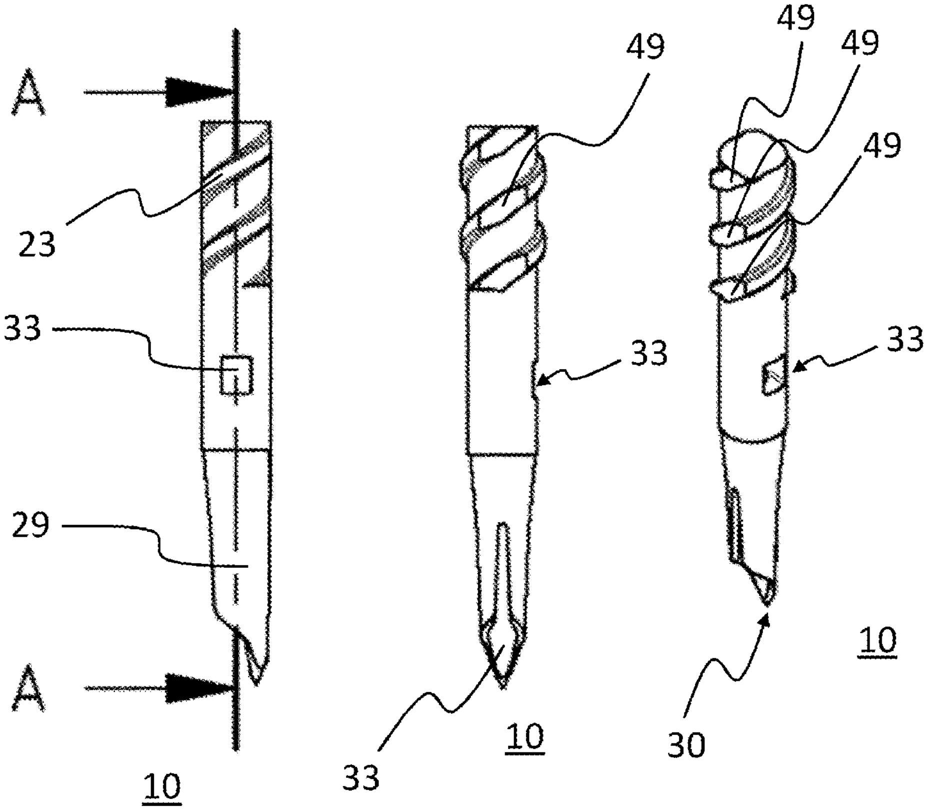
Fig. 8‘
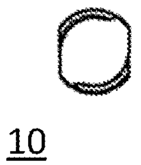
Fig. 10‘
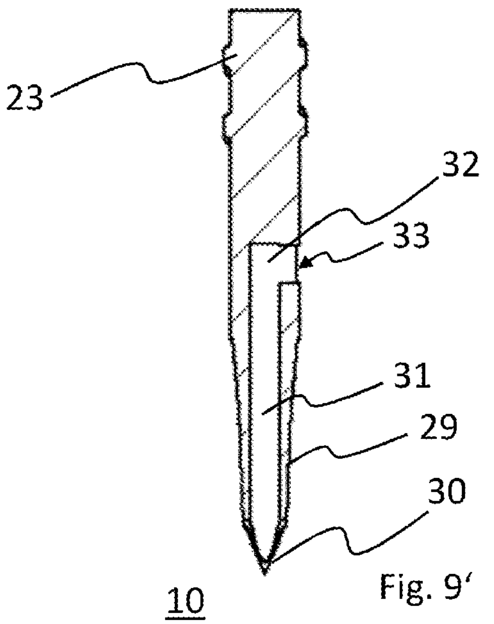
Fig. 9‘

MEDICAL PACKAGING IN THE FORM OF AN INFUSION BAG AND METHOD FOR TRANSFERRING LIQUID FROM A VIAL TO AN INFUSION BAG

CROSS-REFERENCE TO RELATED APPLICATIONS

This application is a national phase under 35 U.S.C. 371 of International Application No. PCT/EP2020/065816 filed on Jun. 8, 2020, which claims priority to European Application No. 19178711.8 filed on Jun. 6, 2019, the contents of all of which are hereby incorporated by reference in their entireties.

FIELD OF THE INVENTION

The invention relates to a medical packaging in the form of an infusion bag, which is fillable with a medical liquid for infusion, for parenteral nutrition or for enteral nutrition and which comprises a connector for connecting a vial. The invention further relates to a connector for connecting a vial to an infusion bag and to a method for providing a fluid connection between a vial and an infusion bag.

BACKGROUND OF THE INVENTION

In order to transfer a medical substance, in particular a drug, to an infusion bag, it is known to configure a port of the infusion bag as what is known as a connector for a vial.

Vials are designed as small bottles with a snap-on or beaded cap which comprises a septum which can be pierced by a hollow needle, in particular what is known as a spike. Liquid can be supplied or withdrawn via the hollow needle or the spike. The substances present in the vial can be for example toxic drugs, such as for example cytostatics.

A connector for connecting a vial can for example be fastened directly on the infusion bag and comprise the spike such that the liquid can flow directly out of the vial into the infusion bag and/or from the infusion bag into the vial to dissolve the powder via the connector. This simplifies not only the transfer of the medical substance, but also increases the safety since it is a closed system.

Such a connector for an infusion bag is e.g. shown in the published patent application WO 2012/101178 A1 (Fresenius Kabi Deutschland GmbH). The connector comprises a spike, and with an axial movement of the spike, it is possible to open and close a fluid connection between the vial and the infusion bag. The spike is clamped in the septum after the vial is placed down and can be moved to open and close the fluid connection by axially displacing the vial.

OBJECT OF THE INVENTION

The object underlying the invention is to provide a connector, via which a fluid connection is enabled in a simple manner between a vial and a medical packaging in the form of an infusion bag.

SUMMARY OF THE INVENTION

The object of the invention is achieved by a medical packaging in the form of an infusion bag, by a connector and by a method for providing a fluid connection according to one of the independent claims.

Preferred embodiments of the invention will be inferred from the subject matter of the dependent claims, the description and the drawings.

The invention generally relates to a medical packaging in the form of an infusion bag which comprise a connector for connecting a vial. The connector comprises a spike for piercing the septum of the vial to provide an initially closed fluid connection to the inner volume of the infusion bag. When the spike is rotated, the fluid connection is opened and it can be closed again, if required.

The spike is preferably designed such that it is or can be arranged in a torsion-proof manner in the pierced septum of the vial. To this end, the spike can for example have a torsion-proof connection. The spike is preferably arranged on the central axis of the connector, in particular of the housing.

The septum of the vial can be used as a drive for a valve, which opens a fluid connection when the vial is rotated.

For this purpose, the spike can have positive-locking elements which act as a torsion-proof connection in the pierced septum. The positive-locking elements can be designed in particular as bars proceeding radially from an outer wall of the spike.

Furthermore, the spike can comprise in one configuration a thread which preferably occupies only one section of the spike. The thread preferably has fewer than two thread flights.

The spike is initially pierced into the septum in this embodiment. The thread is rotated into the septum when the spike is rotated relative to the septum. In this way, the forces acting axially on the septum can be reduced.

In particular, the septum is pulled in the direction of the spike by the thread.

This facilitates the piercing of the septum since the user only has to pierce the septum until the thread engages with the septum.

The septum is widened further by screwing in the spike.

The low forces in the axial direction allow the septum to be connected less fixedly to the vial compared to a spike without a thread, without there being the danger that the septum is pushed out by piercing inwards with the spike.

Additionally, it may be advantageous in the case of this embodiment that the thread prevents the vial being accidentally pulled off.

The proximal end of the thread can in particular have a tip extending in the axial direction. This facilitates the sliding of the thread into the septum. In the case of a further embodiment of the invention, a tip of the spike is arranged on a reinforcement.

The reinforcement can be formed by a thickened wall section extending in the radial direction.

Thus, the spike can absorb high forces during piercing.

The reinforcement preferably runs in the proximal direction.

In particular, the outer contour of the spike merges into a circular section which is arranged between the reinforcement and a section with a torsion-proof connection.

Thus, a good seal effect is achieved after piercing. At the same time, the spike easily slides into the septum.

The section with the torsion-proof connection preferably has, without the positive-locking elements, the largest outer diameter overall. Thus, sufficient sealing is ensured in spite of the positive-locking element(s).

The spike can be easily rotated by rotating the vial pushed onto the spike in order to open or close the connector.

Thus, the invention allows the vial to be inserted into the connector and the fluid connection opened in a simple and safe manner with a handgrip.

In particular, the spike pierced into the septum is secured in the septum in a torsion-proof manner. The spike itself thus forms a torsion-proof connection in the septum.

This torsion-proof connection can be provided by a cross-section of the spike, which is not circular. In particular, the spike can have at least in sections a polygonal cross-section.

Furthermore, the spike can have a positive-locking element, such as e.g. at least one rib, extending in the radial direction.

In the case of one embodiment, the at least one positive-locking element is arranged between the thread and a spike carrier. The septum first slides on the thread in the case of this embodiment of the invention.

The septum is expanded further by rotating the spike by the thread being screwed into the septum. The septum then slides from the thread into a region with the positive-locking element. In this region, the spike preferably has a larger cross-section than proximally in front of the thread. Thus, a torsion-proof connection is provided which can transfer the torques during further rotation to open the fluid connection.

The spike is in particular conical.

The vial is locked in a vial holder of the connector after insertion according to one embodiment of the invention and preferably cannot be removed again in a non-destructive way.

The infusion bag is fillable or filled with a medical liquid. The medical liquid is a liquid which is used for medical purposes and is preferably administered intravenously here. In a preferred embodiment, the medical liquid is therefore an infusion solution. Possible examples of such infusion solutions include:

- sterile water;
- saline solutions, in particular solutions with NaCl—, KCl—, CaCl and/or Mg;
- solutions with hydrocarbons, in particular glucose solutions;
- solutions, emulsions and/or suspensions with nutrients for parenteral nutrition, in particular with lipids, aminoacids and/or glucose;
- colloid solutions, in particular for blood replacement therapy (e.g. Voluven®); and/or
- what is known as pre-mixed systems in which an active ingredient is already added to the medical liquid.

Essentially, the invention can be divided into two different embodiments. Common features of the two embodiments can also be combined with one another.

General Description of a First Embodiment of the Invention

In the case of this embodiment of the invention, the spike is preferably arranged on a spike carrier and a fluid connection is established at the front.

This embodiment of the invention is also described in detail as medical packaging in the form of an infusion bag, which comprises a connector for connecting a vial,

- with the connector comprising a spike for piercing a septum of the vial to provide a fluid connection to an inner volume of the infusion bag,
- characterized in that the spike is designed so as to be rotatable in the connector in order to open the fluid connection from the vial to the inner volume of the infusion bag, and the fluid connection can be established by an opening of a channel connected to the spike being brought into overlap with a channel of a seal by a rotational movement.

According to the first embodiment of this invention, the fluid connection can be established by an opening of a channel connected to the spike being brought into overlap with a channel of a seal by a rotational movement.

The invention in particular provides that a seal is used with a, preferably substantially axial, channel which is sealed off at the front in the closed state of the connector. When the spike is rotated, which causes the vial connected to the spike to rotate, a channel at the front of the seal, which leads to the spike, is brought into overlap with the preferably substantially axial channel of the seal such that a fluid connection is established.

This embodiment of the invention is therefore based on a front sealing. This can for example be implemented by a rotatable plate, which comprises an opening, which can be brought into overlap with an opening of the seal. The rotatable plate can in particular be part of a spike carrier.

It is in particular provided that the opening of a channel connected to the spike is arranged radially offset in relation to a rotational axis of the spike.

The spike is rotated about its central axis with respect to the housing of the connector. The spike can be brought into fluid connection with the channel of the seal via a channel running preferably obliquely and radially outwards. The channel of the seal is also preferably arranged radially offset in relation to the central axis of the spike.

In the case of a preferred embodiment of the invention, the spike is arranged on a spike carrier comprising a disc. The disc is arranged so as to be rotatable in front of the seal, with the seal comprising a preferably axial channel, which extends through the seal.

The, preferably axial, channel of the seal can be brought into overlap with an opening on or in the disc by rotating the disc.

The opening on or in the disc is located on the opposing side of the spike and is connected to the spike by means of an, in particular, obliquely running channel.

The disc can be arranged so as to be rotatable between an upper part and a middle part of the connector. The upper part and the middle part can in particular be locked together. Thus, simple production is ensured.

In a further development of the invention, the upper part is also designed as a vial holder and holds the collar of the vial in the inserted state.

The seal is preferably arranged between a lower part and the middle part of the connector. The lower part and the middle part are in particular locked together.

The lower part comprises the connecting section of the connector, in particular the or a weld section.

According to one embodiment of the invention, the connector has three essential housing components, namely the lower part, the middle part and the upper part.

The housing components are preferably locked together such that an adhesive or weld connection can be dispensed with.

The seal is preferably fixed in a positive-locking manner between the lower part and the middle part, whereas the spike is arranged with a rotatable spike carrier between the middle part and the upper part.

The spike and the disc are in particular designed as an integral plastic part. In particular, the spike, together with the disc, is designed as an injection molded part.

Thus, a part can be easily provided which can be arranged in the housing of the connector and, together with the seal, provides a valve by the disc with an opening, which is connected to the spike via a channel, being brought into overlap with a channel of the seal.

The spike is preferably rotated only about its central axis to open the connector. The opening on the spike carrier is located radially offset in relation to the central axis and therefore to the rotational axis.

When the spike is rotated, the opening on the spike carrier migrates around the rotational axis as a result and can thus be brought into overlap with the channel of the seal which is likewise radially offset in relation to the rotational axis.

The spike is therefore only rotated when the connector is opened and is substantially not axially displaced. This simplifies the design of a positive-locking connection between the septum of the vial and the spike.

In the case of a further development of the invention, the connector comprises a tamper-evident closure which comprises a removable cap covering the spike.

The tamper-evident closure is preferably designed in such manner that the cap comprises a break-off insert.

Thus, the cap can be designed as a break-off part and be separated from the insert.

The insert is preferably secured in the upper part of the connector.

It is in particular conceivable to lock the insert in the upper part of the connector before connecting upper part and middle part.

The spike is designed in such manner that it is arranged in a torsion-proof manner in the pierced septum of the vial.

In particular, the spike has at least in sections a cross-section which is not round and particularly preferably comprises an edge and/or the spike comprises lateral positive-locking elements, e.g. ribs, which can be pressed into or cut into the septum.

The spike can be designed in particular in sections to be polygonal, for example trapezoidal, in its cross-section.

Furthermore, the spike can at least in sections have a rib extending radially along the spike. This rib can in particular be designed in such manner that it cuts into the septum and thus forms a torsion-proof connection.

The at least one rib can be designed in particular as a fin which is enlarged towards the back proceeding from a side wall of the spike. The rib in particular the fin can be pressed or cut into the septum of the vial and can thus form a positive-locking connection.

The connector is preferably designed in such manner that the spike is movable from a closed position into an open position by a more than one eighth turn and/or less than a full turn, in particular by roughly a quarter turn.

Thus, the connector can be easily opened and depending on the embodiment, also easily closed again, if required. The fluid connection can also be closed again, according to one embodiment of the invention, preferably by a rotational movement in the opposing direction to the opening direction.

Liquid can flow from the vial into the infusion bag and from the infusion bag into the vial via the fluid connection, for example to dissolve an active ingredient present as a powder and/or to first dilute a liquid active ingredient.

After a, preferably complete, liquid transfer into the infusion bag, the fluid connection can be closed to prevent the remaining infusion liquid flowing back in the vial or remaining there during the infusion.

The infusion bag is preferably formed of foils welded together, in particular polypropylene foils.

According to one embodiment, the connector comprises a vial holder in which the vial or the head of the vial is lockable. The vial is thus held in the connected state not only by the spike, but, with its head, which forms a collar, mechanically locks with the connector. The vial holder is preferably designed in such manner that the connection between the vial and the connector cannot be released again during intended use.

The lower part of the connector can be connected directly to the foil of the infusion bag, e.g. by it comprising a weld-in shuttle which is welded into a weld seam of the infusion bag.

According to another embodiment, the connector is designed as an adapter, in which a housing part of the connector can be coupled or connected to the port of an infusion bag, for example via a Luer or a Luer lock connection. In this configuration, the connector, preferably the lower part of the connector, instead of the connecting section for welding, has a connection piece for connecting to a port.

According to one embodiment, the connector comprises a lower part and a middle part, with the seal element being arranged at least in the middle part, with the lower part and the middle part being locked together. The middle part and the lower part are easily locked together when the connector is assembled, with the seal element being inserted between them and being held there in a clamped manner. The seal element is preferably compressed when locked. The lower part and the middle part are preferably secured against one another in a torsion-proof manner, in particular by means of positive-locking elements engaging into one another.

In order to ensure a secure seat of the seal element, the seal element can be provided with a circumferential ring-shaped section which is secured in a positive-locking manner in a groove provided by the housing of the connector. The groove of the housing can in particular comprise a lower section in the lower part and an upper section in the middle part.

The seal element consists at least of an elastic material, in particular of polyisoprene, bromobutyl or chlorobutyl.

The spike preferably consists of plastic. In particular, the spike consists of a hard material like the housing components of the connector, in particular like the lower part of the connector. The spike can thus be easily pierced into the septum.

In particular, the material of the spike comprises a polycarbonate. This particular is hard and can also be autoclaved. The housing components of the connector, in particular the lower part, the middle part and/or the upper part with its vial holder, preferably comprise polypropylene.

In the case of a further development of the invention, the connector comprises an indicator which displays whether the connector is open or closed.

The connector can in particular comprise at least one lateral window, through which the indicator is to be seen in the open or closed position of the connector.

In the case of one embodiment, in which the connector can be opened and closed, the housing of the connector preferably comprises two windows, and the user, depending on through which window the indicator is to be seen, can easily discern whether the connector is open or closed.

In the case of another embodiment, in which the spike or a structural element connected to the spike is locked in the open state in such manner that the spike can no longer be turned back, the connector can also comprise only one window which indicates that the connector is in its open position.

According to a preferred embodiment of the invention, the indicator is arranged on a spring, which can snap the indicator into one of the windows in the open and/or closed state of the connector.

In this way, on the one hand, the visual readability of the indicator can be improved since indicator looks into the window, which is formed in the housing wall by an opening, or looks out of the opening.

By snapping the indicator into the window, an acoustic signal can also be generated, for instance in the form of a click, such that it is acoustically signaled to the user that the connector is for example located in an open position.

Furthermore, a noticeable resistance can also be provided by the indicator arranged on a spring, which must be overcome when the vial is rotated in order to move the spike out of an open and/or a closed position.

In the case of one embodiment, in which the connector is designed in such manner that it is locked in an open position, a locking can also be provided by the indicator, for example by it being designed as a hook, which locks with the window and thus prevents the spike or a structural element connected to the spike from turning back.

General Description of a Second Embodiment of the Invention

A second embodiment of the invention comprises an axially displaceable spike.

This embodiment of the invention is described in detail by a medical packaging in the form of an infusion bag which comprise a connector for connecting a vial,

- with the connector comprising a spike for piercing a septum of the vial to establish a fluid connection to an inner volume of the infusion bag,
- characterized in that the spike is designed so as to be rotatable in the connector and comprises a channel with a lateral opening, which adjoins a seal element, preferably of the connector, in a closed state of the fluid connection,
- with the spike being axially displaceable when the vial is rotated in such manner that the lateral opening is moved out of the seal element and the fluid connection from the vial to the inner volume of the infusion bag is opened.

The fluid connection can preferably also be closed again by way of a rotational movement in the opposing direction. Liquid can flow from the vial into the infusion bag and from the infusion bag into the vial via the fluid connection, for example to dissolve an active ingredient present as a powder and/or to first dilute a liquid active ingredient.

After a, preferably complete, liquid transfer into the infusion bag, the fluid connection can be closed to prevent the remaining infusion liquid flowing back into the vial during the infusion, the transport and/or further handling, and remaining in the vial.

The infusion bag is preferably formed of foils welded together, in particular polypropylene foils.

The spike, which can also be designated as a hollow needle, comprises an axial channel, through which liquid can flow up to the lateral opening.

The lateral opening in the closed state of the fluid connection is preferably sealed off by a ring-shaped seal element. As a result, good and secure sealing is achieved. The lateral opening can be provided with a large opening cross-section, in particular of over 2 $mm^2$.

The actuation of the valve formed by the connector is convenient and secure. Furthermore, it is easily possible to configure the spike to be torsion-proof with respect to the septum of the vial, via which the spike is rotated, since the rotation is directed perpendicular to the piercing direction. A torsion-proof connection between the spike and the septum therefore does not make it difficult to pierce the septum.

The rotation of the vial causes a rotation of the spike in the connector. The rotation of the vial is a relative rotation of the vial with respect to the housing of the connector and/or with respect to the medical packaging preferably in the form of an infusion bag. The rotation of the spike can therefore also be carried out by rotating the medical packaging and/or the connector with respect to the vial.

According to one embodiment, the connector comprises a vial holder in which the vial or the head of the vial is lockable. The vial is thus held in the connected state not only by the spike, but, with the head of the vial, which forms a collar, mechanically locks with the connector. The vial holder is preferably designed in such manner that the connection between the vial and the connector cannot be released again during intended use.

The spike preferably comprises a thread, in particular an outer thread, which is guided in a thread, in particular in an inner thread, of a housing part of the connector, in particular of a lower part.

The thread, with which an axial displacement is generated via a rotational movement, is preferably located behind the lateral opening when viewed from the vial.

It is in particular provided that the spike comprises a thread and a piercing section with a tip, with the lateral opening preferably being located between the piercing section and the thread.

The lower part of the connector can be connected directly to the foil of the infusion bag, e.g. by it comprising a weld-in shuttle which is welded into a weld seam of the infusion bag.

According to another embodiment, the connector is designed as an adapter, in which a housing part of the connector can be coupled or connected to the port of an infusion bag, for example via a Luer or a Luer lock connection. In this configuration, the connector, preferably the lower part of the connector, instead of the connecting section for welding, has a connection piece for connecting to a port.

The thread is preferably designed at least with two flights, particularly preferably exactly two flights. Thus, in the case of a rotational movement, a relatively large axial displacement can be easily achieved, in particular of more than 2 mm in the case of a half turn.

In the case of a preferred embodiment of the invention, the thread of the spike and/or the thread of a housing part of the connector comprises recesses for the passage of liquid. Thus, the liquid can flow past the thread via a large free cross-section.

In particular, the thread of the housing part can be designed segmented. As a result, recesses are provided in the thread or in the thread pitches. They are in such manner that axial channels are formed in the thread which extend along the inner side of the housing part, preferably along the channel in the lower part of the connector.

The thread of the spike preferably also comprises at least one, preferably a plurality of, axially extending recesses. The recesses can be designed in particular as a flattened portion of the thread teeth. In the open state of the connector, the recesses of the thread on the spike overlap at least partially with the recesses of the thread in the housing part of the connector. An axially extending channel is thus formed in the thread. Thus, an axial fluid connection is enabled from the lateral opening to the infusion bag.

The spike is preferably designed in such manner that it sits in the septum of the vial in a torsion-proof manner. This is in particular possible by way of a cross-section deviating from a round shape. In particular, the spike can have at least in the region in which the septum of the vial sits in the inserted state, a cross-section which is at least in sections polygonal, in particular trapezoidal.

In the case of a preferred embodiment of the invention, the spike extends through a lower part of the connector and through another adjoining housing part of the connector, in particular through a middle part, which is connected to the lower part, with the lower part being sealed off with respect to the adjoining housing part via the seal element.

The seal element thus seals not only the lateral opening of the spike in the closed state of the fluid connection, but rather at the same time also forms a seal of the inner volume of the infusion bag with respect to the outside. To this end, the seal element sits in particular between the housing lower part and the housing middle part of the connector.

The connector is preferably designed in such manner that the spike is moved from a closed position into an open position by a quarter turn or more and/or less than a full turn, in particular by roughly a half turn.

According to one embodiment, the connector comprises a lower part with a thread for the spike and a middle part, with the seal element being arranged at least in the middle part, with lower part and middle part being locked together. The middle part and the lower part are easily locked together when the connector is assembled, with the seal element being inserted between them and being held there in a clamped manner. The seal element is preferably compressed when locked. The lower part and the middle part are preferably secured against one another in a torsion-proof manner, in particular by means of a toothing engaging into one another.

In order to ensure a secure seat of the seal element, a seal element can be used with a circumferential ring-shaped section which is secured in a positive-locking manner in a groove provided by the housing of the connector. The groove of the housing can in particular comprise a lower section in the lower part and an upper section in the middle part.

The seal element consists at least of an elastic material, in particular of TPE (thermoplastic elastomer) polyisoprene, EPDM (ethylene propylene diene monomer), bromobutyl or chlorobutyl.

The spike preferably consists of plastic. In particular, the spike consists of a hard material like the housing components of the connector, in particular like the lower part of the connector. The spike can thus be easily pierced into the septum.

In particular, the material of the spike comprises a polycarbonate. This particular is hard and can also be autoclaved. The housing components of the connector, in particular the lower part, the middle part and/or the vial holder, preferably comprise polypropylene.

The invention further relates to a medical packaging in the form of an infusion bag, in particular having one or a plurality of the features described above. The infusion bag comprises a connector, with the connector having a spike for piercing the septum of the vial to provide a fluid connection to the inner volume of the infusion bag. According to the invention, the connector comprises a vial holder with a plurality of clamping fingers inclined inwards in the insertion direction of the vial.

According to this aspect of the invention, via a plurality of clamping fingers distributed over the circumference of the connector, a secure locking of the vial in the connector is enabled, which preferably cannot be released in a non-destructive manner.

The connector preferably comprises 4 to 10, particularly preferably 6 to 10 clamping fingers distributed over the circumference. The clamping fingers are preferably inclined in the insertion direction of the vial with respect to a plane located perpendicular to a central axis of the connector by an angle of more than 10°, preferably more than 30°, particularly preferably more than 40° and/or less than 80°, preferably less than 70°, particularly preferably less than 60°.

The individual clamping fingers are preferably configured so as to taper. It is in particular provided that the clamping fingers taper in the top view (in the width) and that the thickness of the clamping fingers reduces towards the tip. The thickness of the clamping fingers is in particular reduced towards the tip by them being flattened on an upper side and on an underside towards the tip.

This configuration can provide slightly deflecting clamping fingers which, after inserting the vial, grip on its cap and/or its head when pulling the vial back and thus securely prevent the vial being able to be removed again.

According to one embodiment of the invention, the vial holder comprises a funnel-shaped, in particular cup-shaped section for introducing the vial or introducing the head of the vial. The head of the vial is thus fed to the spike in a centered manner when introduced.

The invention further relates to a connector for a medical packaging, in particular for the medical packaging described above. The connector can have all the above features in relation to the connector.

The invention is also described in detail according to one embodiment by a connector for a medical packaging to provide a fluid connection between the medical packaging and a vial, with the connector comprising a spike for piercing a septum of the vial and a seal element surrounding the spike, characterized in that the spike is designed so as to be rotatable in the connector and comprises a channel with a lateral opening which adjoins the seal element in a closed fluid connection or rests tightly on the seal element, with the spike being axially displaceable by rotating the vial in such manner that the lateral opening of the channel moves axially out of the seal element and the fluid connection between the vial and the medical packaging is opened.

The invention is also described in detail according to one embodiment by a connector for a medical packaging for providing a fluid connection between the medical packaging and a vial, with the connector comprising a spike for piercing a septum of the vial, characterized in that the spike is arranged on a spike carrier comprising a disc, with the disc being arranged so as to be rotatable in front of a seal, with the seal comprising an axial channel, and the axial channel of the seal can be brought into overlap with an opening on the disc by rotating the disc and thus the fluid connection between the vial and the medical packaging is opened.

The invention can also be described according to one configuration by a connector for a medical packaging for providing a fluid connection between the medical packaging and a vial, with the connector comprising a spike for piercing a septum of the vial, with the spike comprising a thread, which preferably occupies only one section of the spike. The thread preferably has fewer than two thread flights.

The invention can also be described according to one configuration by a connector for a medical packaging for providing a fluid connection between the medical packaging and a vial, with the connector comprising a spike for piercing a septum of the vial, with a tip of the spike being arranged on a reinforcement.

According to a first embodiment, the connector is a component of the port of the medical packaging. The connector is permanently connected to the medical packaging. The medical packaging can for example be designed as an infusion bag or as an infusion bottle.

According to a second embodiment, the connector is designed as an initially separate adapter connectable to the port of a medical packaging. The connector to this end comprises a connection piece, which can be connected e.g. to the port of a medical packaging. The port can e.g. be present on an infusion bag or on the cap of an infusion bottle. The connection piece of the connector can be designed e.g. as a male Luer lock connector which can be connected to a female Luer lock connector of a medical packaging.

The invention further relates to a method for providing a fluid connection between a first medical packaging, preferably in the form of a vial, and a connector, which comprises a spike, of a second medical packaging preferably in the form of an infusion bag. The second medical packaging preferably corresponds to the previously described medical packaging. The connector, the first medical packaging and/or the second medical packaging can have all features referred to above.

The invention is described in detail by a method for providing a fluid connection between a first medical packaging, preferably in the form of a vial, and a connector, which comprises a spike, of a second medical packaging preferably in the form of an infusion bag, with the first medical packaging being pushed onto the connector of the second medical packaging such that the spike pierces a septum of the first medical packaging to provide a preferably initially closed fluid connection to the inner volume of the second medical packaging, characterized in that the spike is rotated by rotating the first medical packaging and/or the connector and in doing so the fluid connection from the first medical packaging to the second medical packaging is opened.

In one embodiment of the invention, the spike can be turned back again by rotating the first medical packaging and/or the connector such that the fluid connection is closed again.

According to the invention, the spike is rotated by rotating the vial and in doing so a fluid connection to the infusion bag is opened. A convenient opening of the fluid connection is enabled through the rotary actuation of the spike via the septum of the vial. At the same time, a torsion-proof connection can easily be provided between the spike and the septum, without making it difficult to pierce the septum.

According to a first embodiment, the spike, as mentioned above, is arranged on a spike carrier comprising a disc. The disc is arranged so as to be rotatable in front of a seal. The seal comprises an axial channel. On the side opposite the spike, the disc comprises an opening via which a channel leads to the spike. By rotating the disc, with the spike driving the disc via the septum of the vial, the axial channel can be brought into overlap with the opening on the disc in order to thus open the fluid connection between the vial and the medical packaging.

According to a second embodiment, the spike is displaced axially during opening, as described above, with a lateral opening being moved out of a seal element.

BRIEF DESCRIPTION OF THE DRAWINGS

The invention will be explained in more detail below with reference to preferred exemplary embodiments of the invention.

FIG. 1 is a view of a medical packaging in the form of an infusion bag.

FIG. 2 is a perspective view of the connector.

FIG. 3 is a perspective exploded representation of the connector.

FIG. 4 to FIG. 6 are detailed representations of the spike carrier with the spike. In this case, FIG. 4 is a perspective view, FIG. 5 is a top view of the rear side and FIG. 6 is a sectioned view.

FIG. 7 is a perspective representation of the middle part of the connector and FIG. 8 is a sectioned view.

FIG. 9 is a sectioned view of the seal.

FIG. 10 is a perspective representation of the lower part.

FIG. 11 to FIG. 13 show the upper part in a detailed representation. FIG. 11 is a perspective view, FIG. 12 is a top view and FIG. 13 is a sectioned view.

FIG. 14 is a perspective view of the tamper-evident closure in the form of a cap.

FIG. 15 to FIG. 17 show an alternative embodiment of the invention in which the middle part of the housing of the connector and of the spike carrier cooperate in such manner that the spike is secured in a torsion-proof manner and is locked in an open end position.

FIG. 15 is a perspective view of the middle part used for this purpose.

FIG. 16 is a top view of the middle part from below.

FIG. 17 is a perspective view of the spike carrier with spike.

FIG. 18 is a sectioned view of the connector represented in FIG. 1 to FIG. 14 in closed state.

FIG. 19 is a sectioned view of the connector in open state.

FIG. 20 shows an embodiment of the invention changed in particular compared to FIG. 1 to FIG. 14, in which an indicator of the spike is not locked in the end positions and in which the spike has a different configuration.

FIG. 21 is a perspective detailed view of the middle part of this embodiment.

FIG. 22 and FIG. 23 are detailed views of the spike together with spike carrier.

FIG. 24 is a perspective detailed view of the cap of the connector.

Another exemplary embodiment of the invention is explained with reference to FIG. 29 to FIG. 36 in which the spike does not have a thread, but instead is provided with a reinforced tip.

Figure 29:
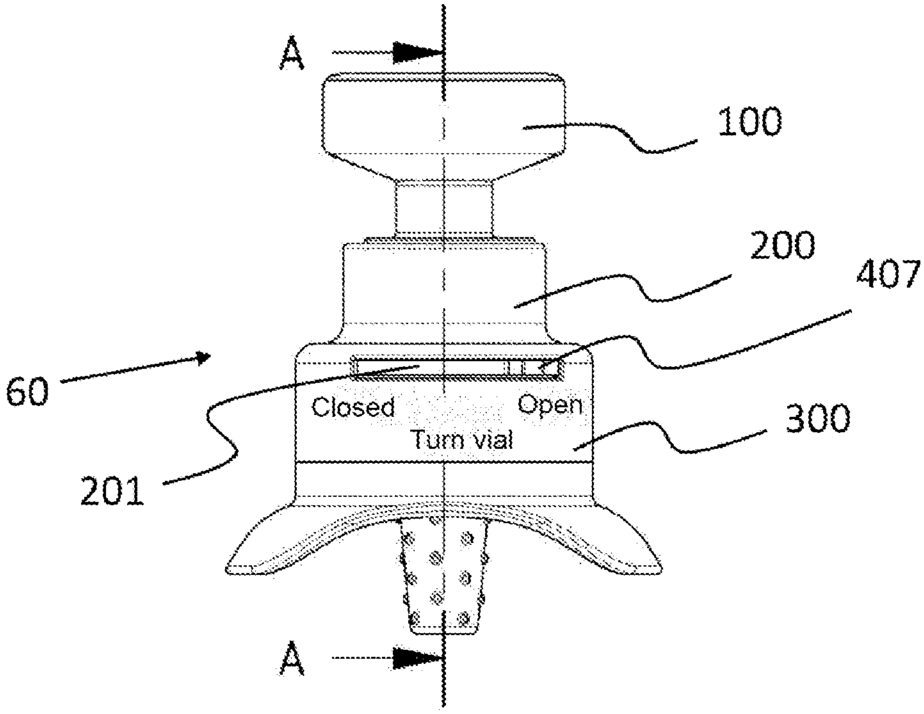
Figure 30:
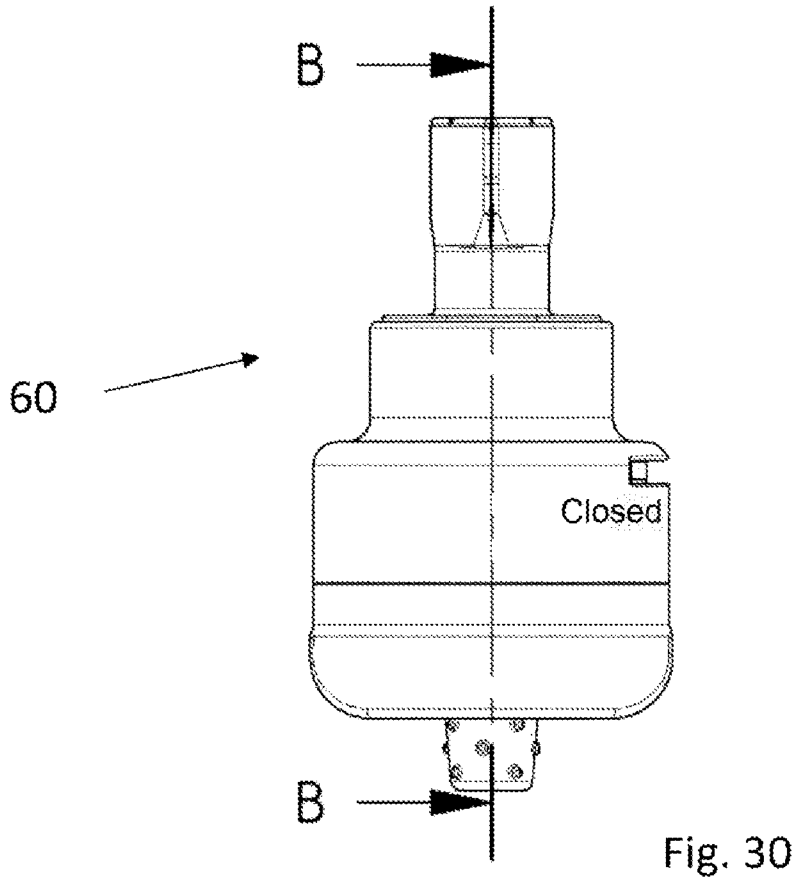

FIG. 29 and FIG. 30 are side views.

Figure 31:
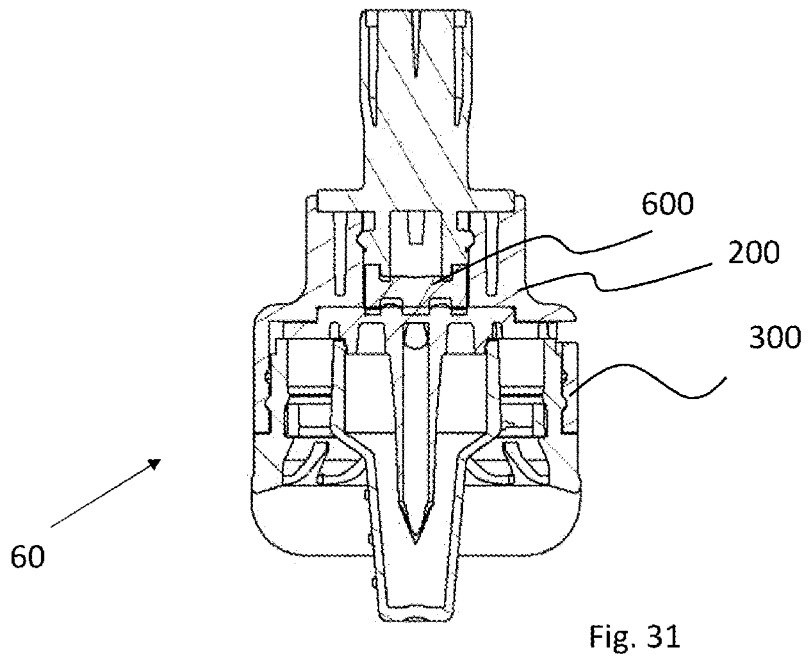
Figure 32:
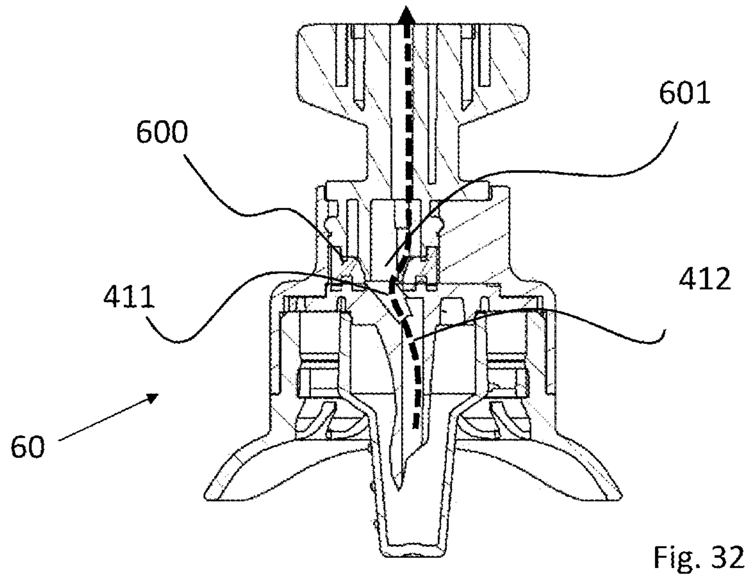

FIG. 31 is a longitudinal section along the line A-A of FIG. 29 and FIG. 32 a longitudinal section along the line B-B of FIG. 30.

Figure 33:
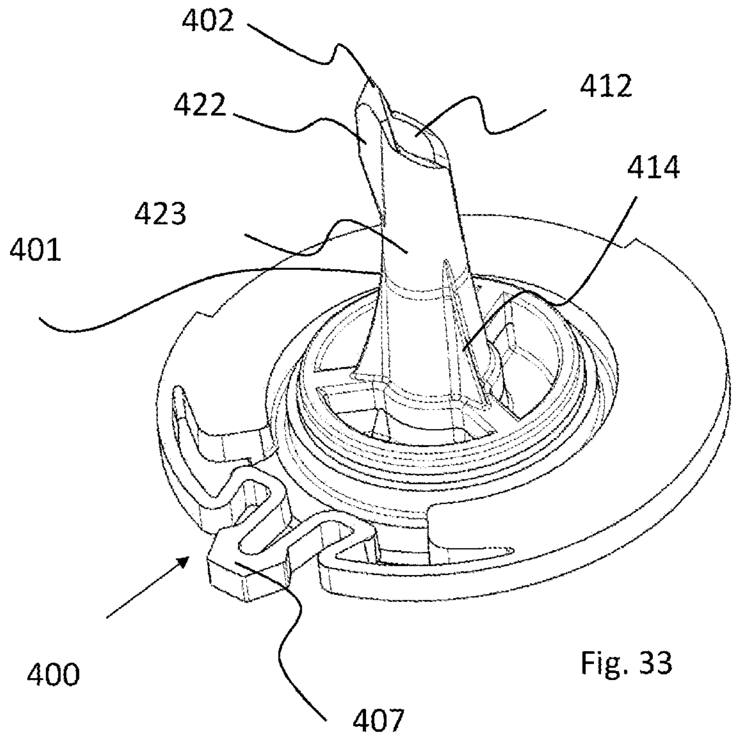

FIG. 33 shows the spike carrier with spike in a perspective view.

Figure 34:
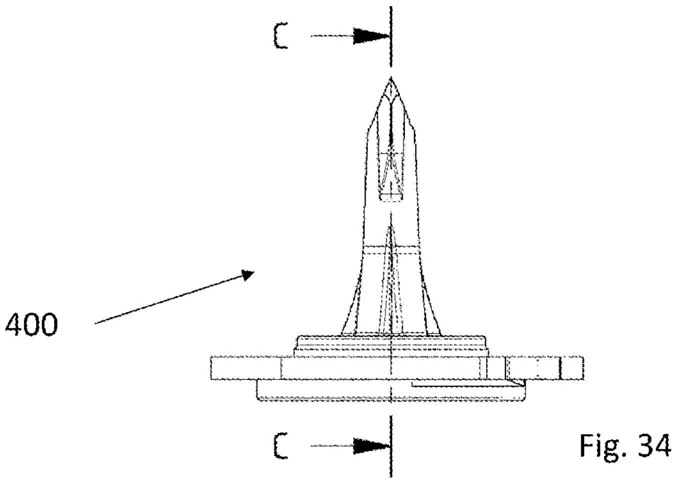

FIG. 34 is a side view of the spike carrier with spike.

Figure 35:
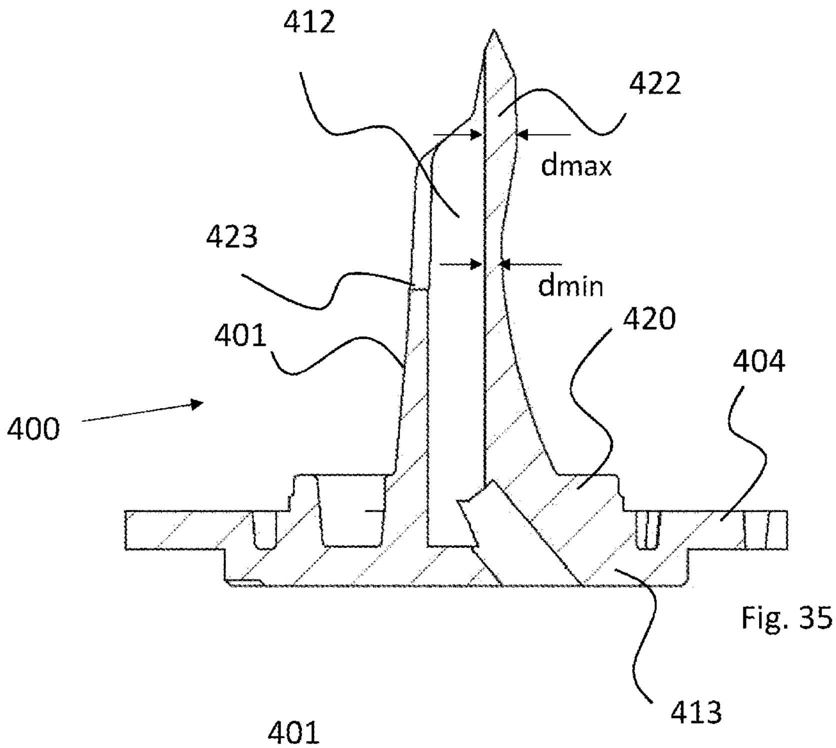

FIG. 35 is a longitudinal section along the line C-C of FIG. 34.

Figure 36:
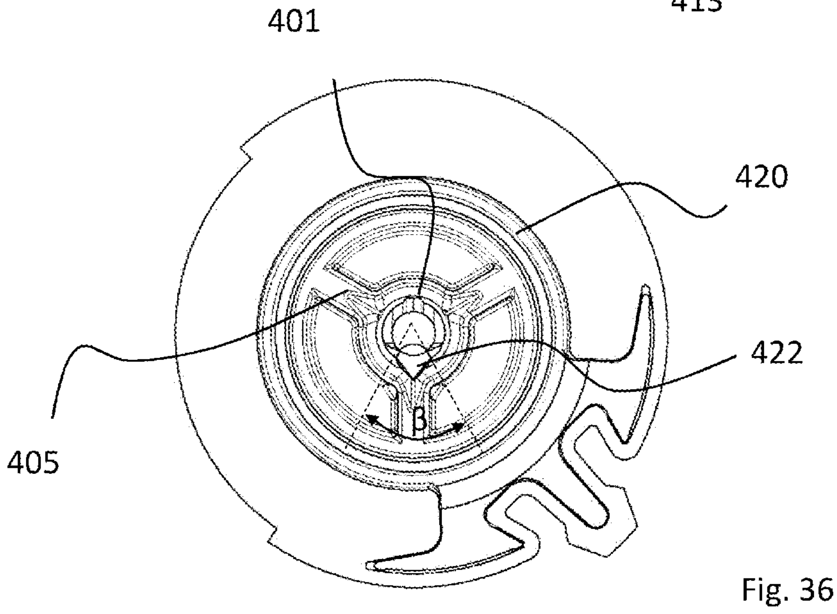

FIG. 36 is a top view of the spike carrier with spike from a distal position.

Figure 37:
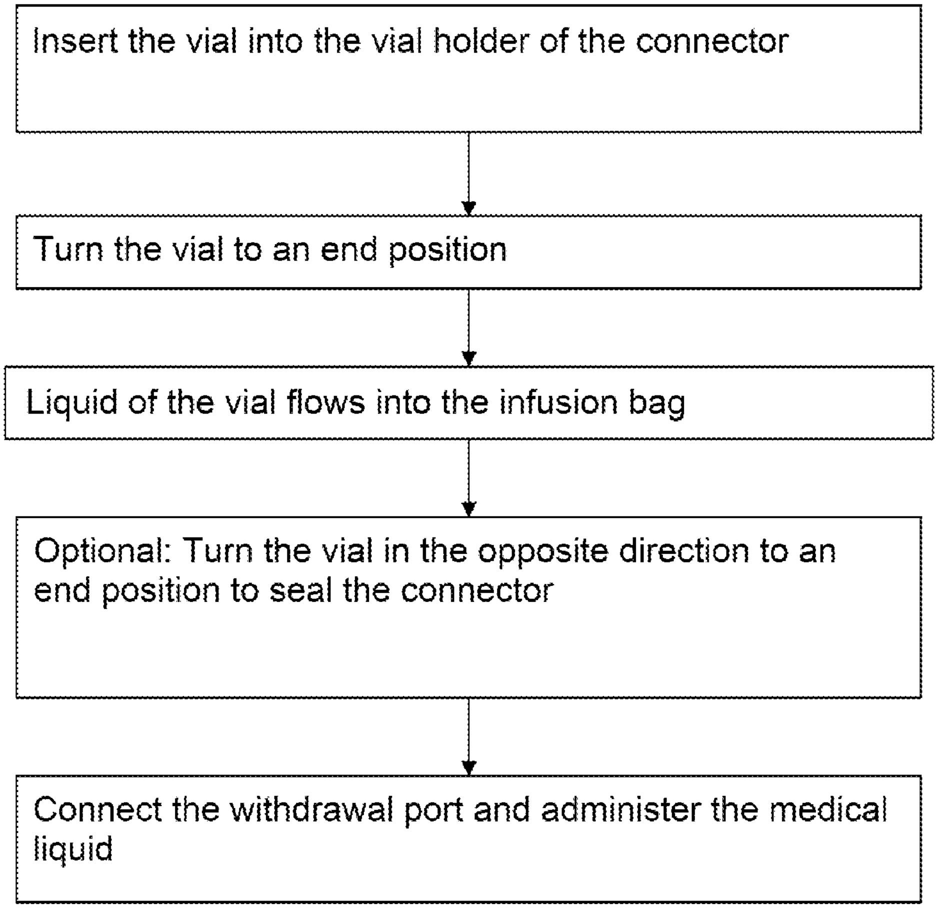

FIG. 37 is a flow diagram of an exemplary embodiment of the method according to the invention.

Figure 1:
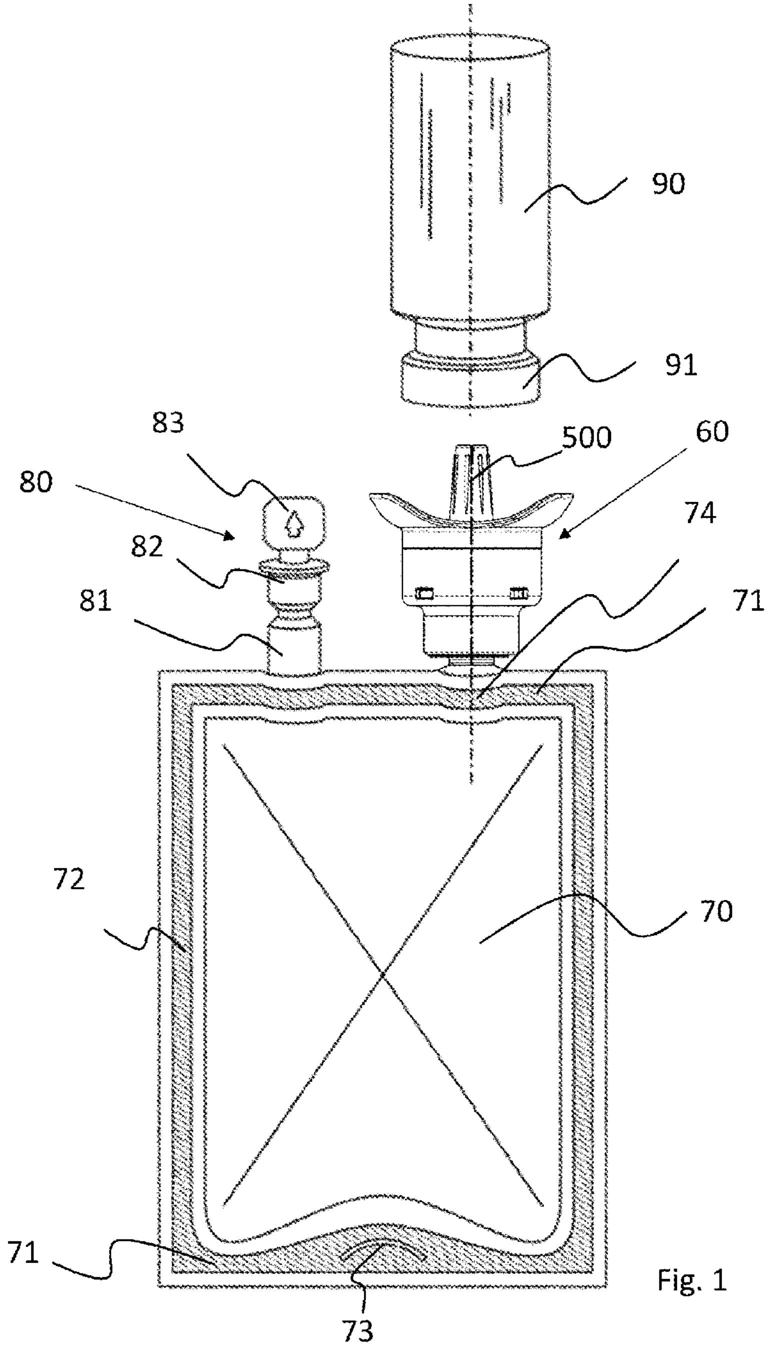
FIG. 1 to FIG. 24 show a first embodiment of the invention, in which the vial is arranged on a rotatable disc.
Figure 1:
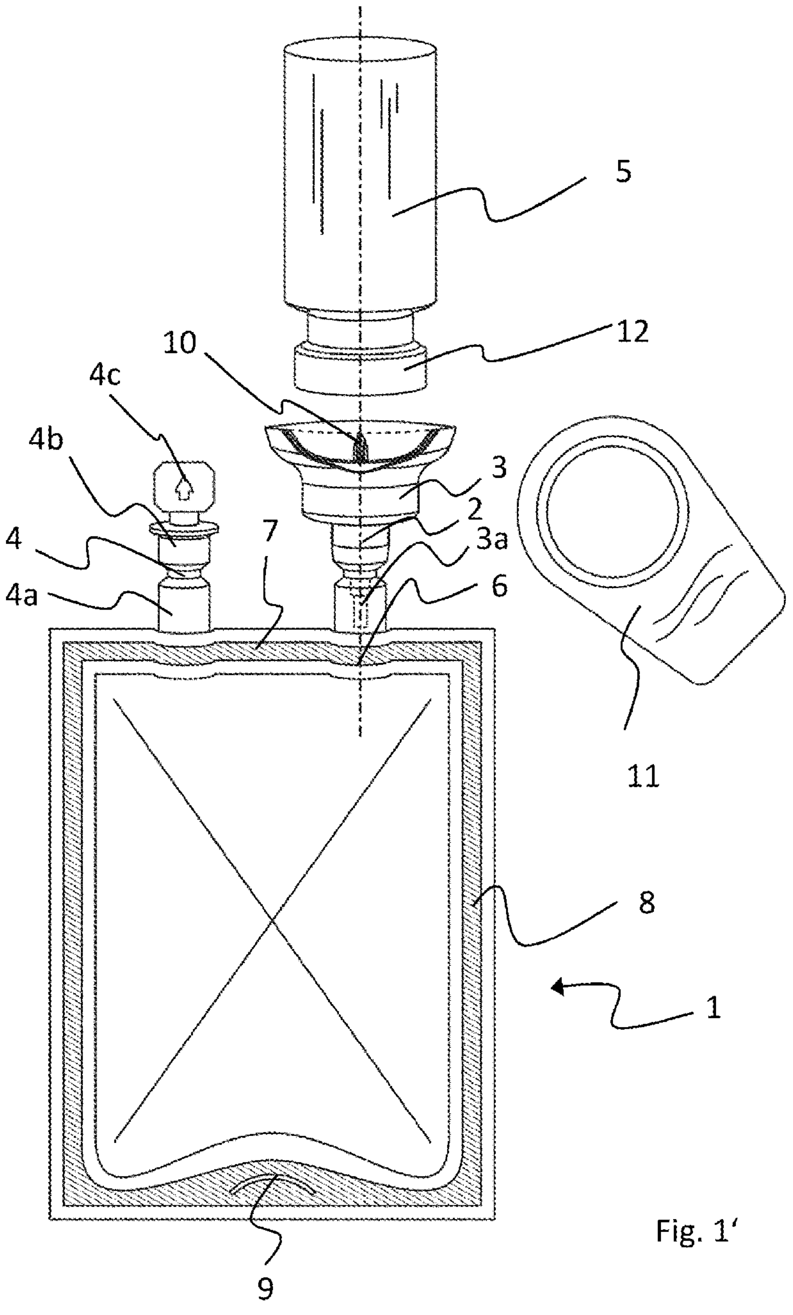
Figure 19:
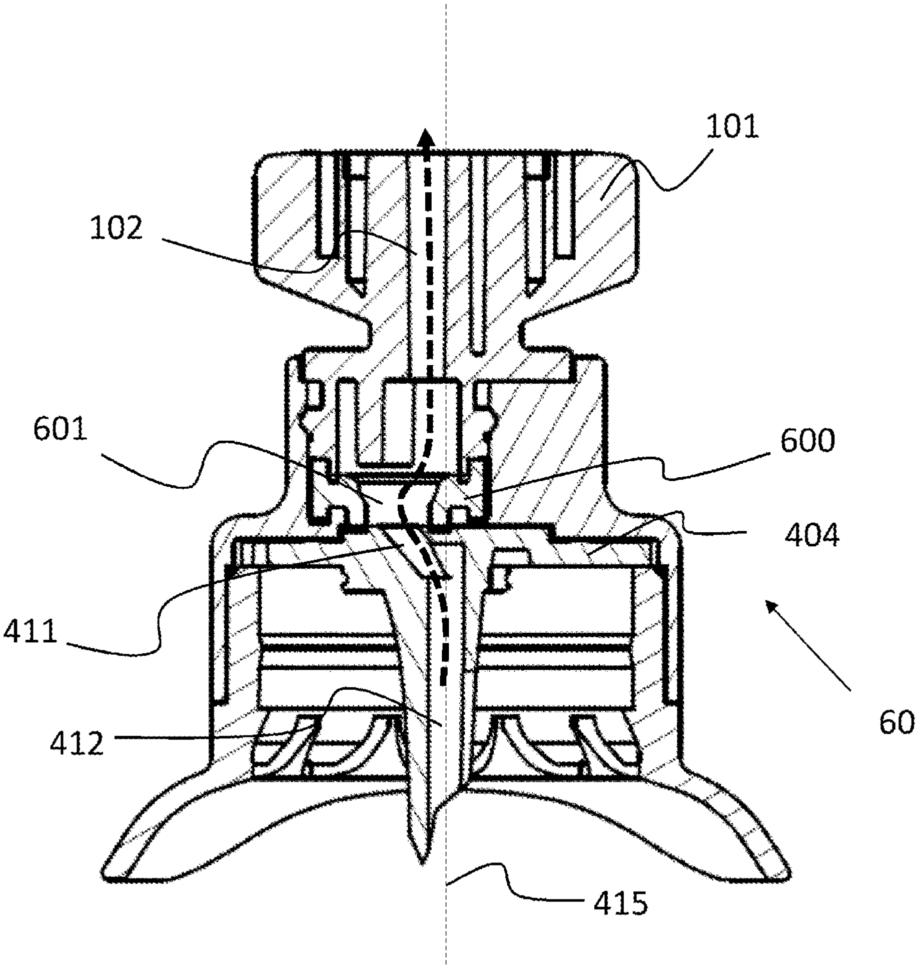
Figure 19:
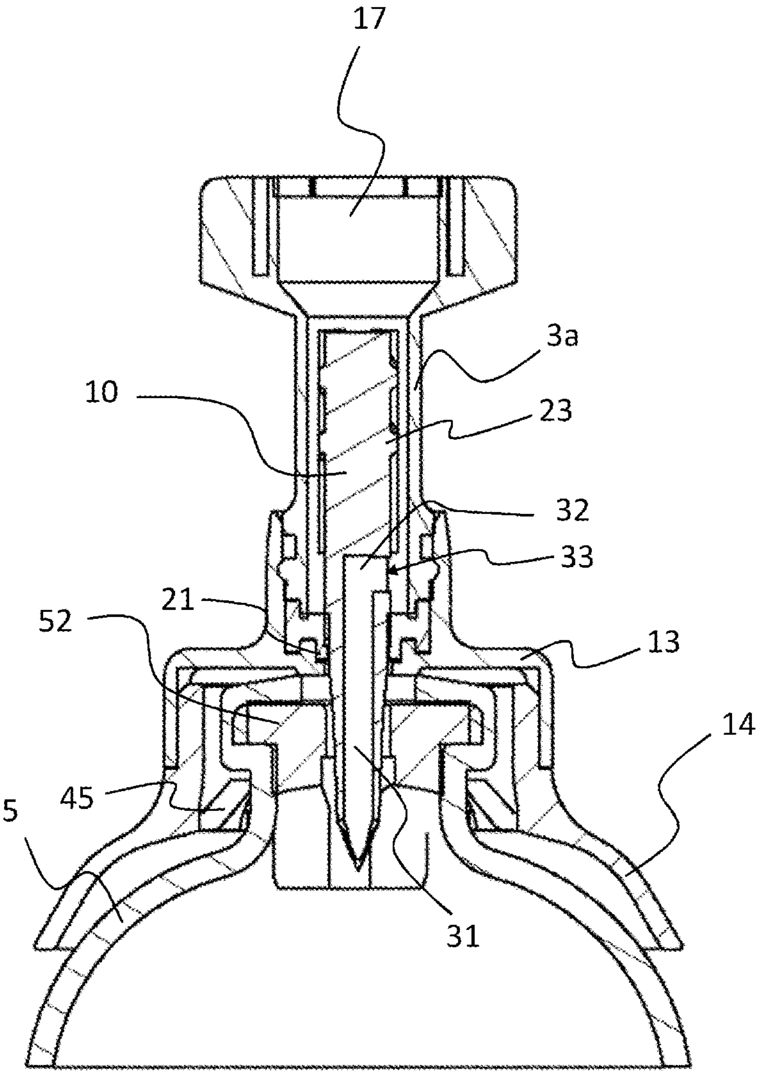

FIG. 1' to FIG. 19' show a second embodiment of the invention in which the spike has a lateral opening and is pushed axially by a rotational movement.

FIG. 1' is a view of a medical packaging in the form of an infusion bag with a connector together with a vial, which will be connected to the infusion bag.

Figure 2:
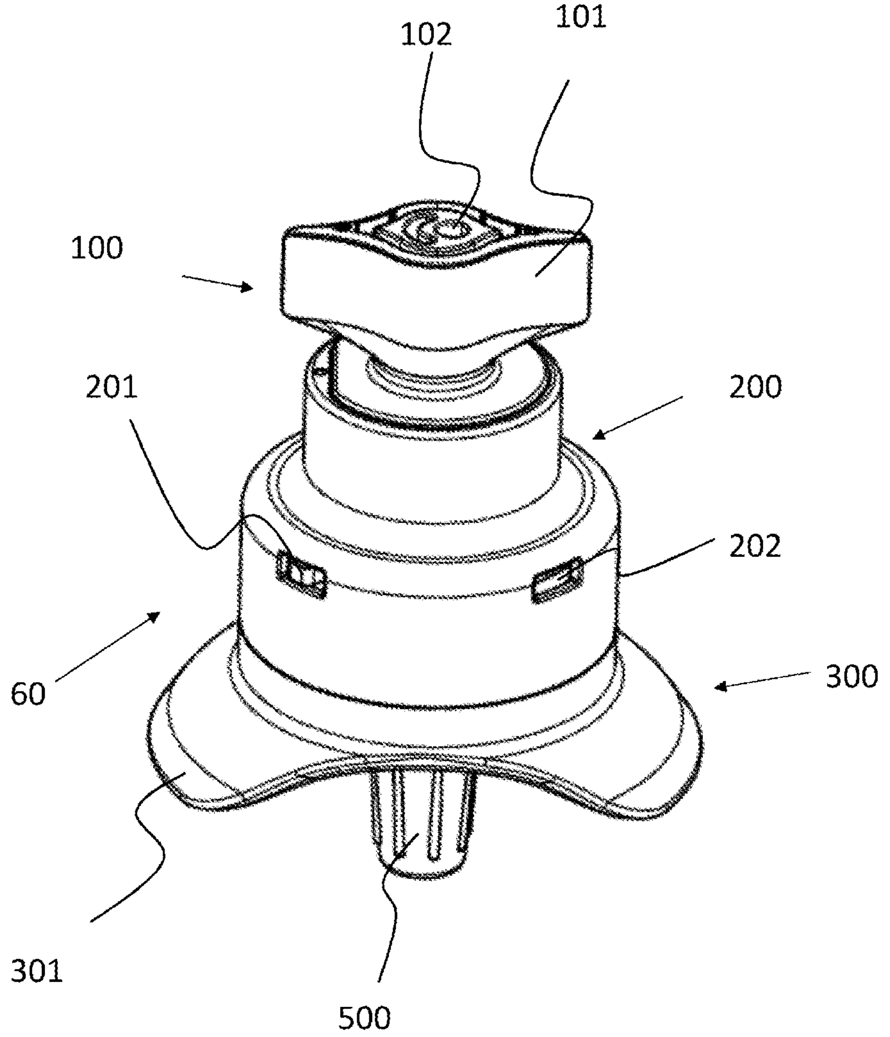
Figure 2:
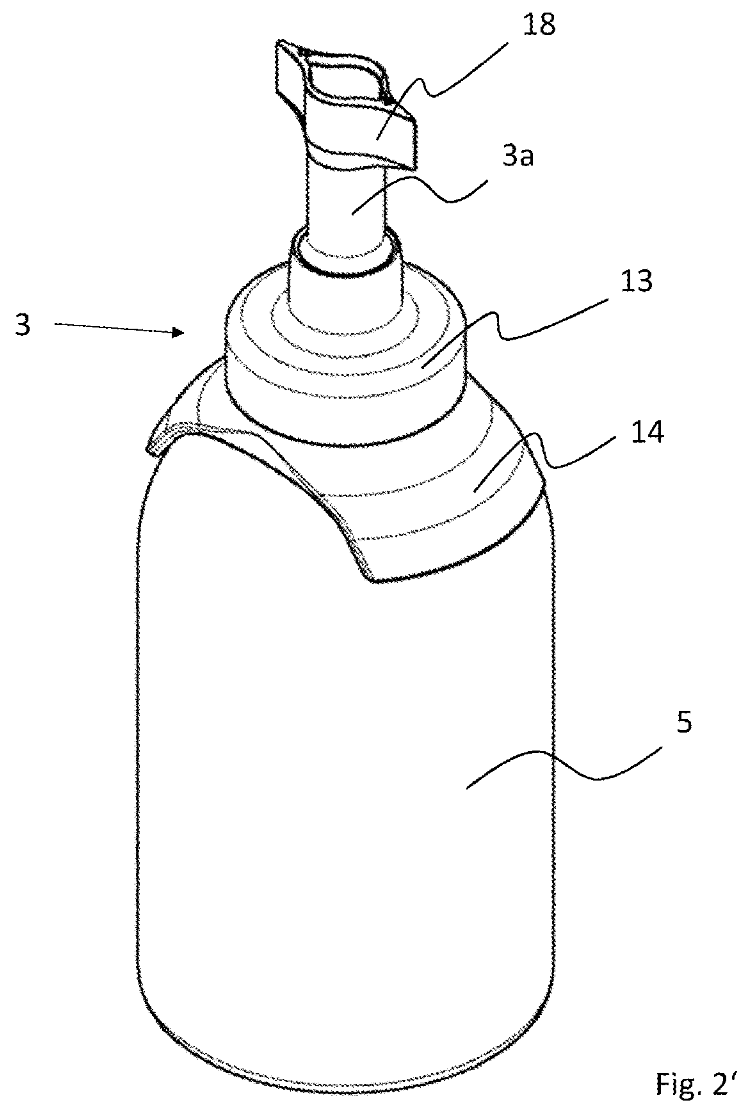

FIG. 2' is a perspective view of the vial connected to the connector.

Figure 3:
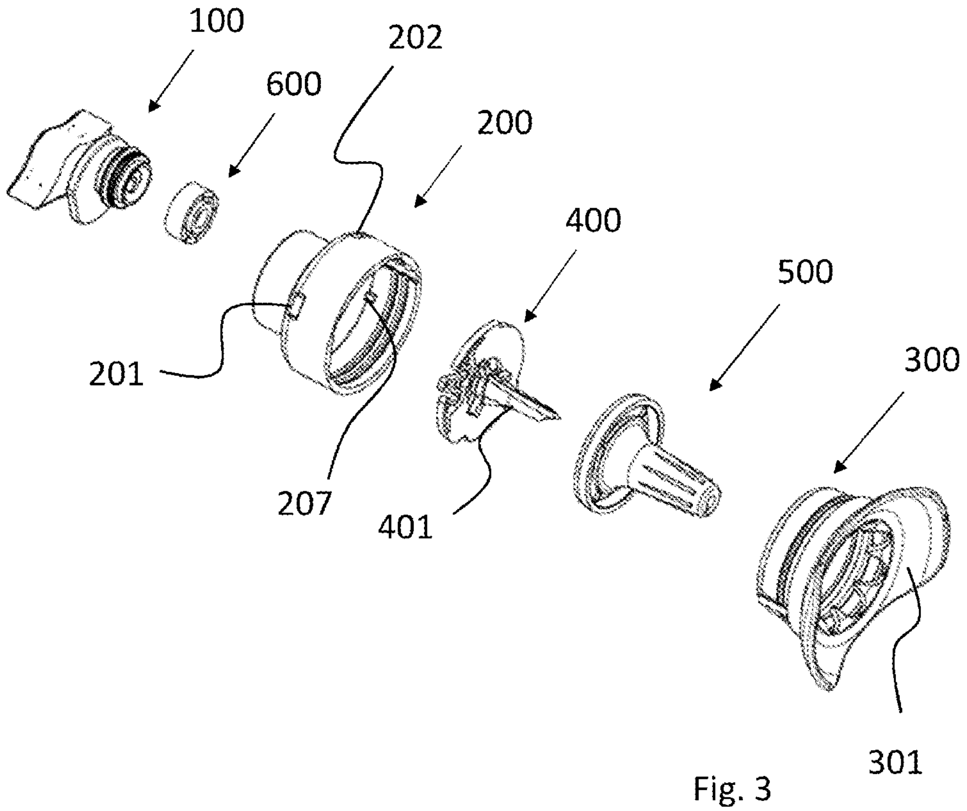

FIG. 3' is a sectioned view of the connector (without a connected vial).

Figure 4:
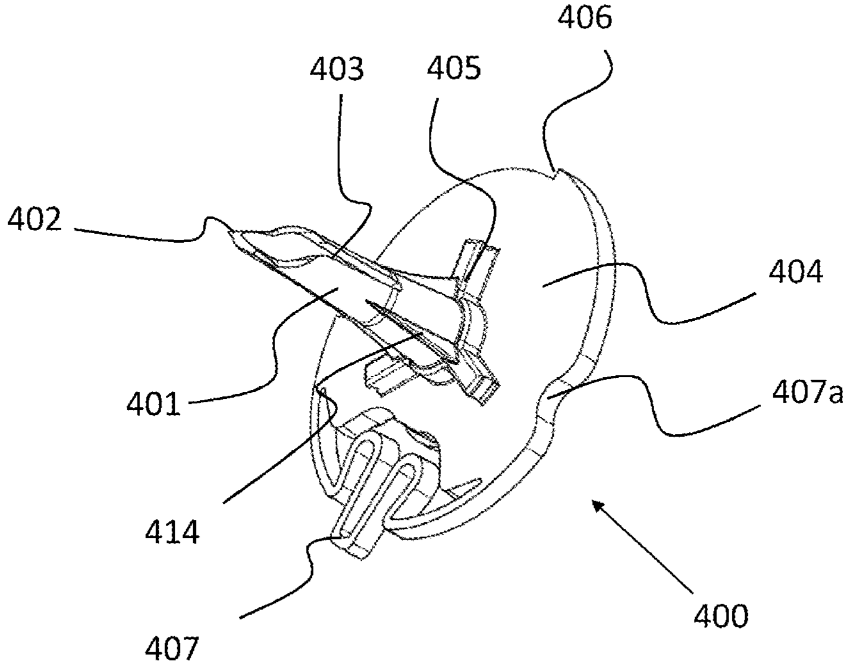

FIG. 4' is a perspective exploded representation of the connector.

Figure 5:
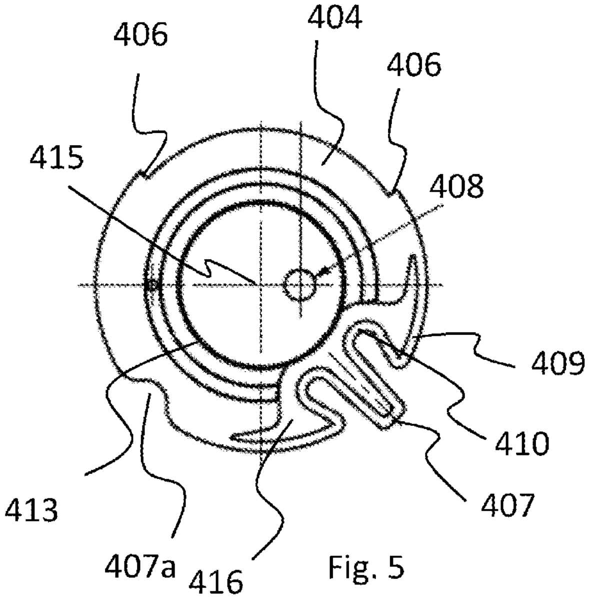
Figure 6:
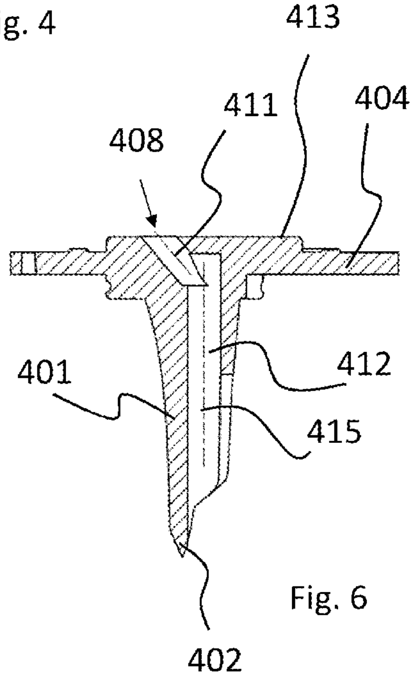
Figure 4:
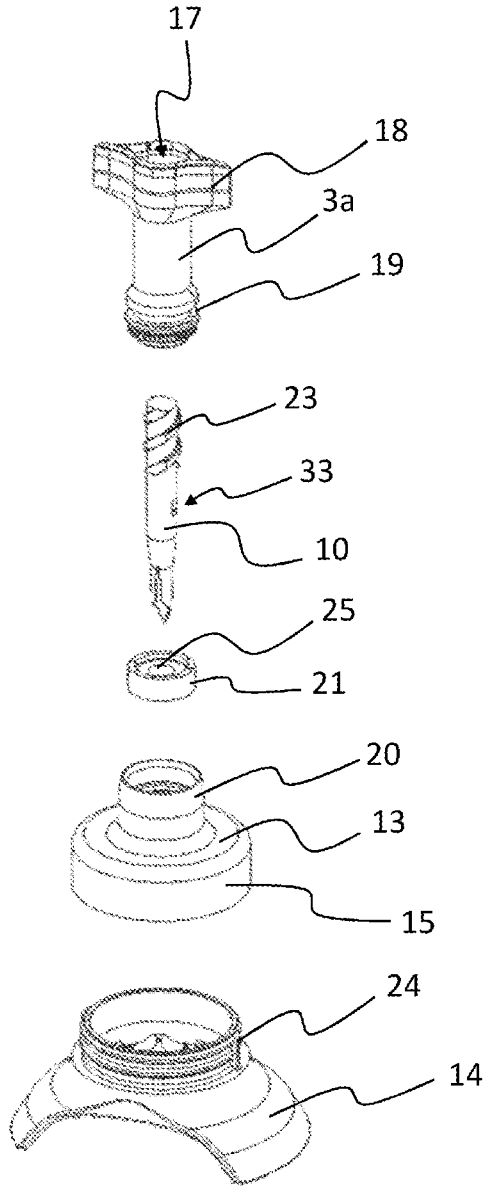
Figure 7:
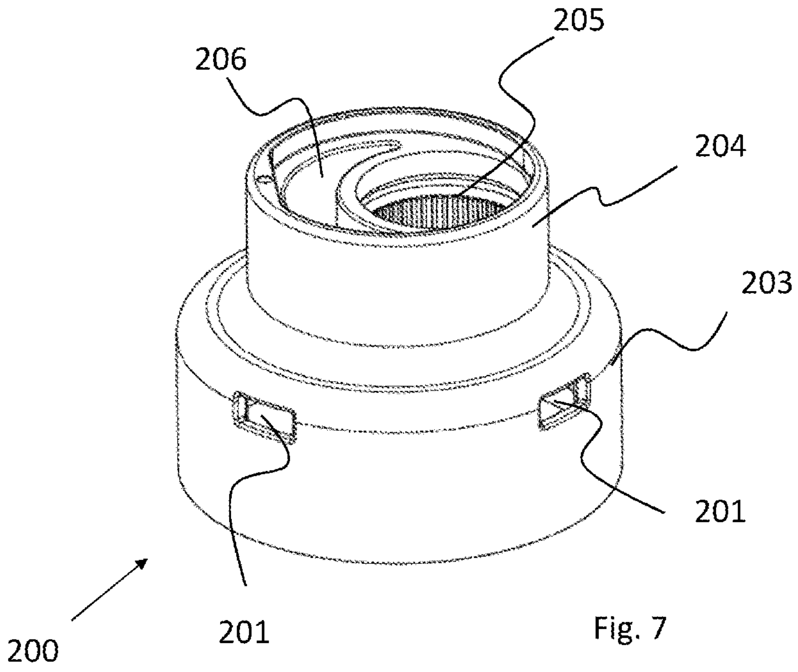

FIG. 5' to FIG. 7' are different views of the lower part of the connector, with FIG. 5' being a perspective view, FIG. 6' a longitudinal section and FIG. 7' a top view of the weld-in section of the lower part.

Figure 8:
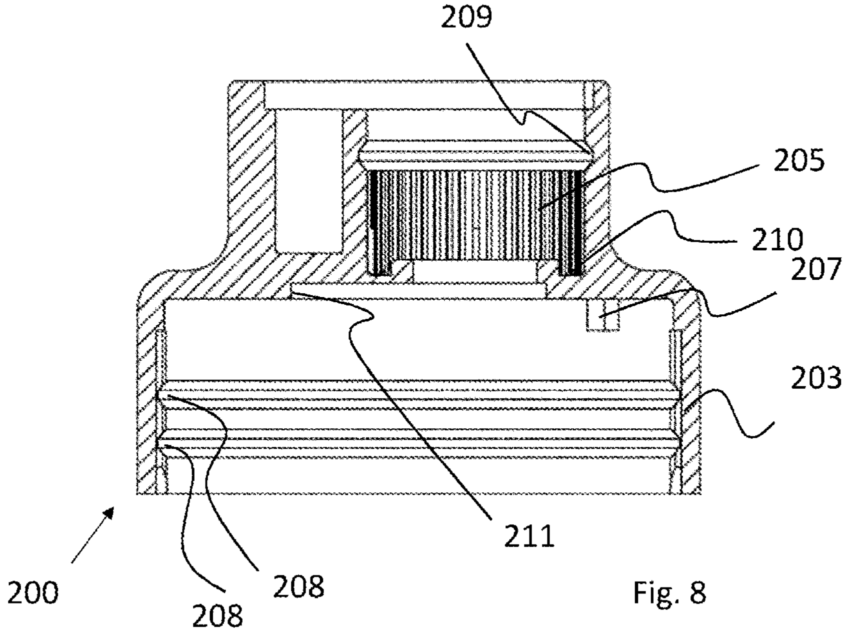
Figure 5:
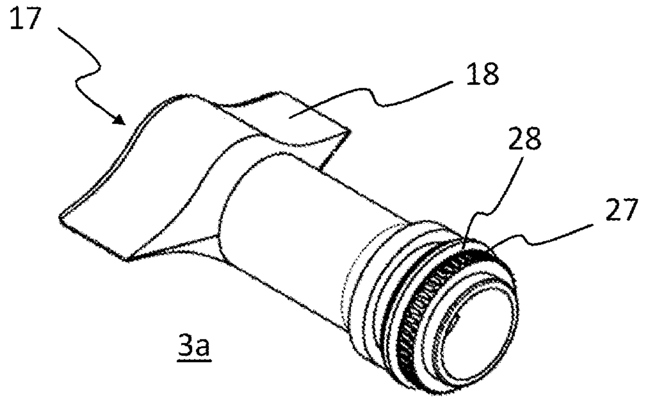
Figure 6:
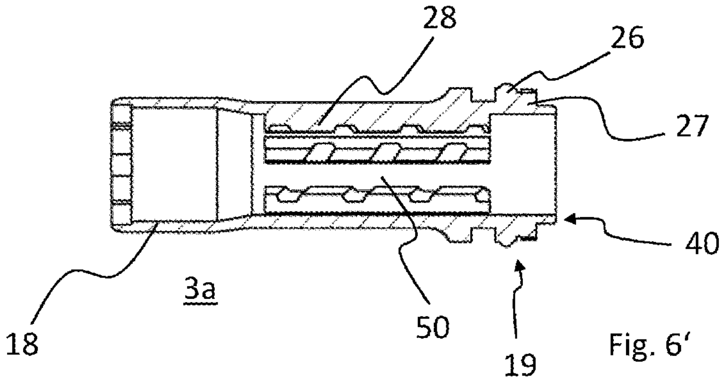
Figure 7:
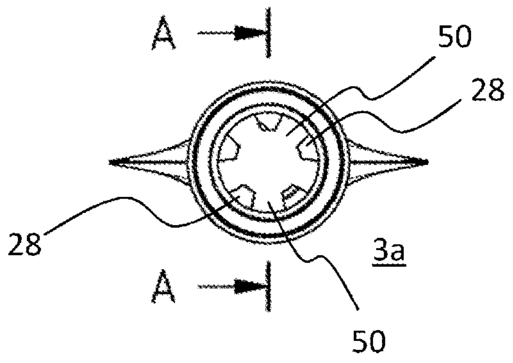
Figure 9:
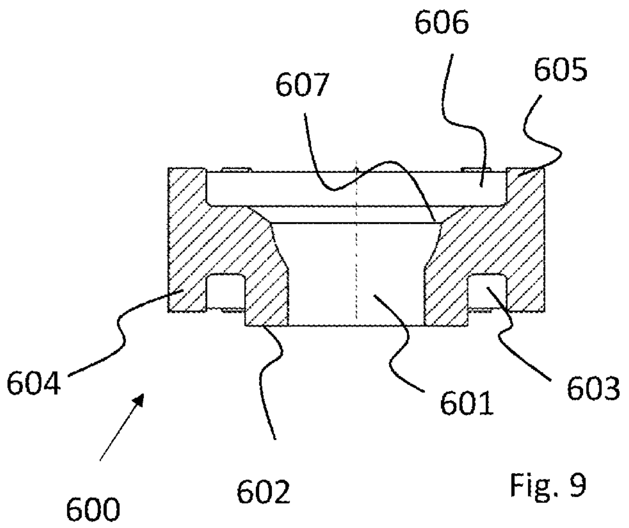
Figure 10:
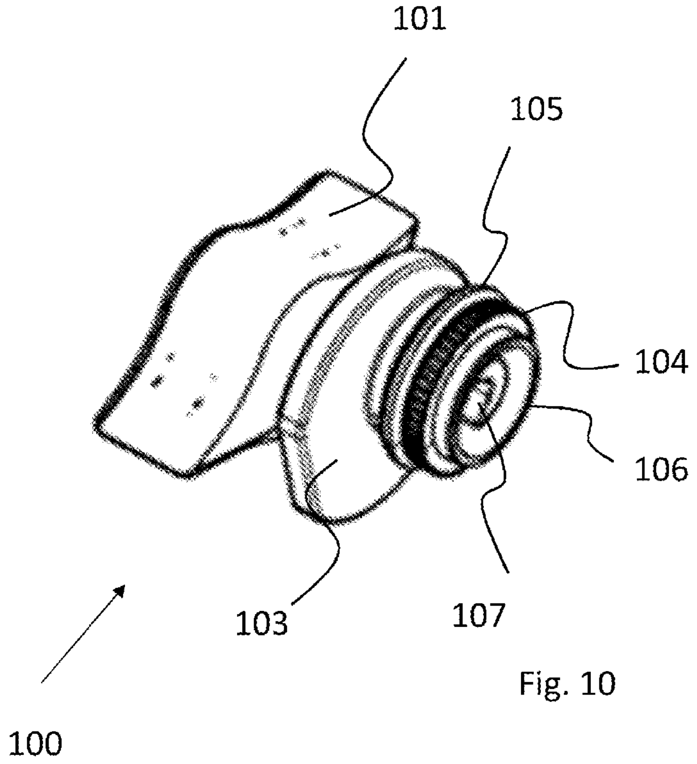

FIG. 8' to FIG. 10' show the spike of the connector, with FIG. 8' comprising two side views and a perspective view, FIG. 9' is an axial sectioned view and FIG. 10' is a cross-sectional view.

Figure 11:
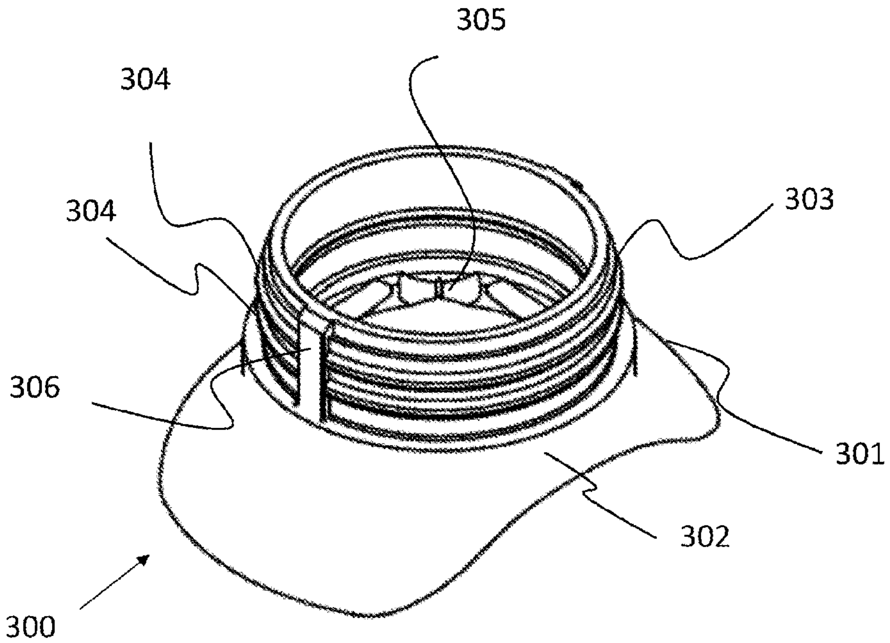
Figure 12:
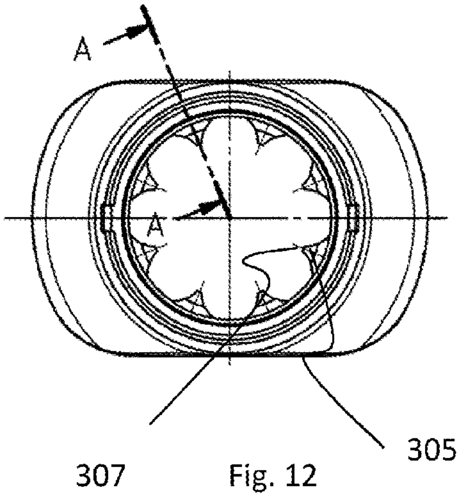

FIGS. 11' and 12' show the seal element of the connector, FIG. 11' is a perspective view of the seal element and FIG. 12' is a sectioned view of the seal element.

Figure 13:
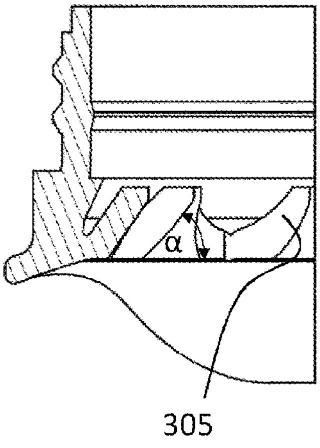
Figure 11:
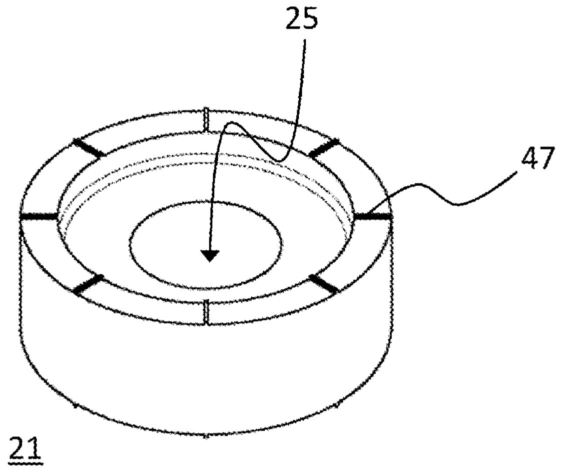
Figure 12:
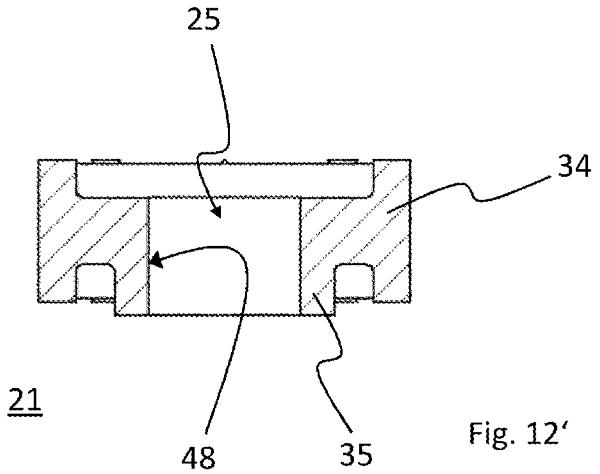
Figure 14:
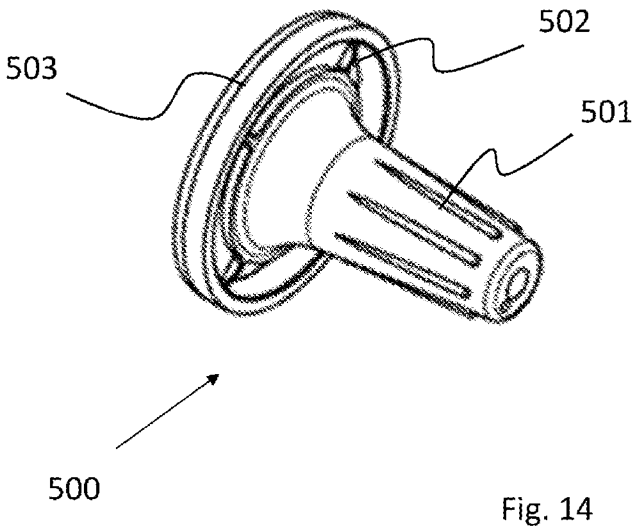
Figure 13:
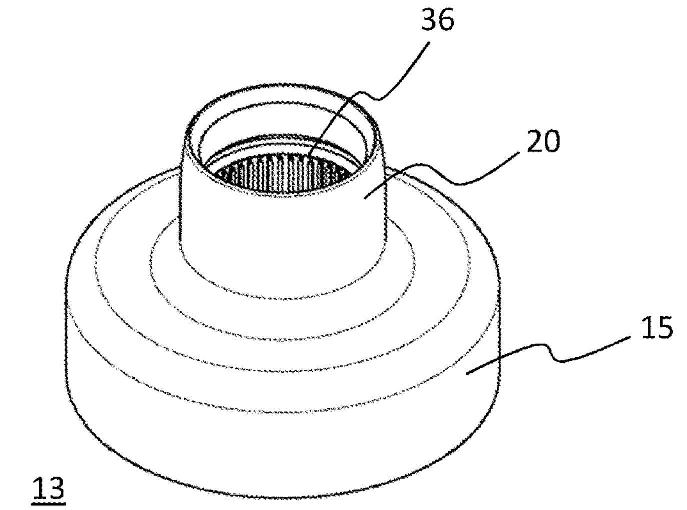
Figure 14:
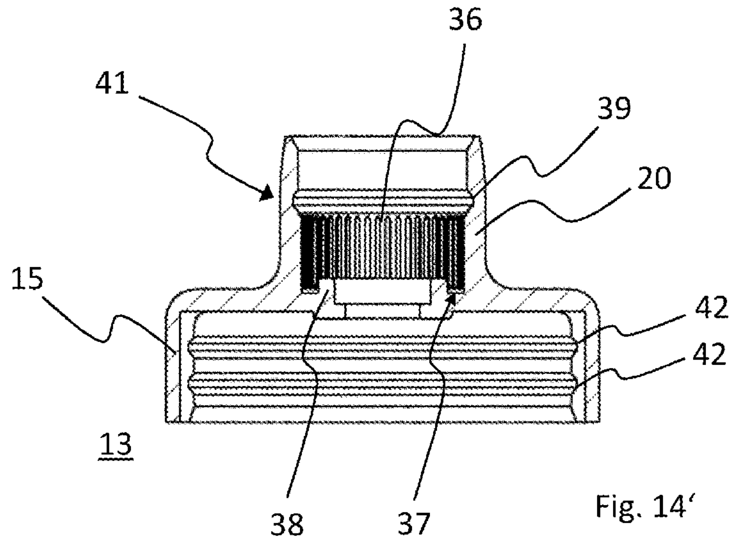

FIGS. 13' and 14' show the middle part of the connector, with FIG. 13' being a perspective representation of the middle part of the connector and FIG. 14' being a sectioned view of the middle part of the connector.

Figure 15:
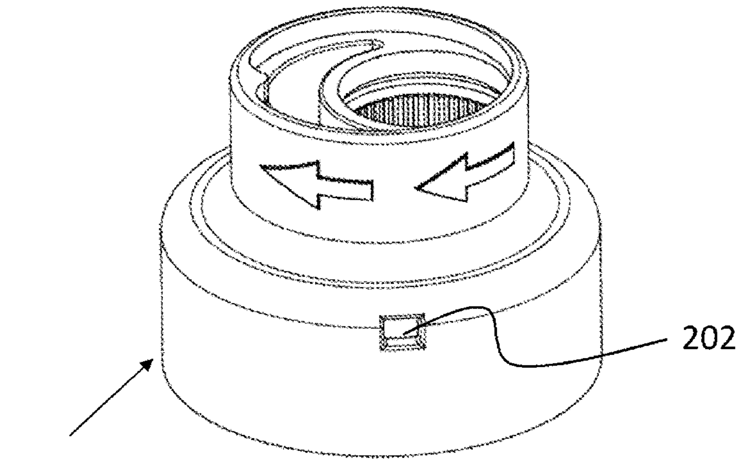
Figure 16:
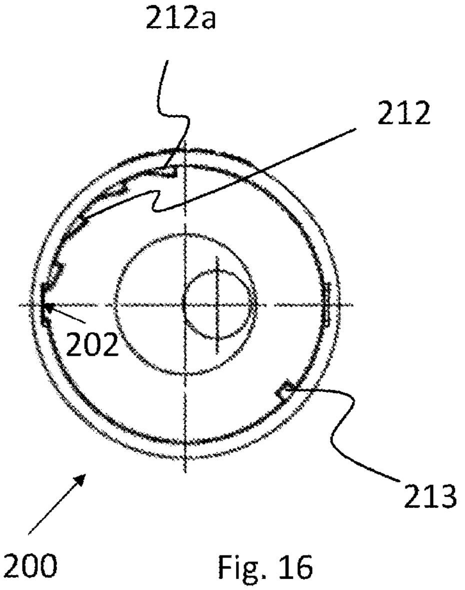
Figure 17:
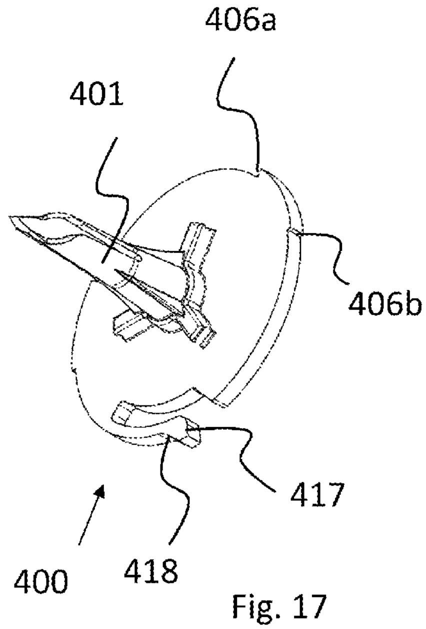
Figure 15:
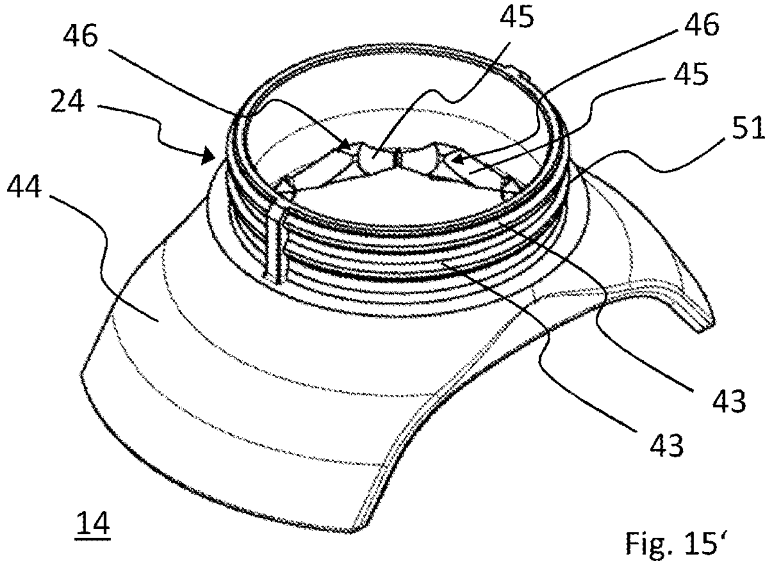
Figure 16:
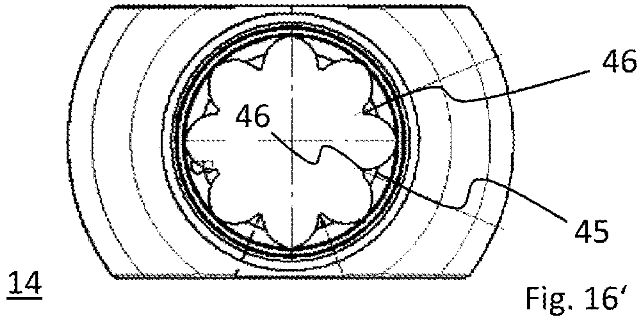
Figure 17:
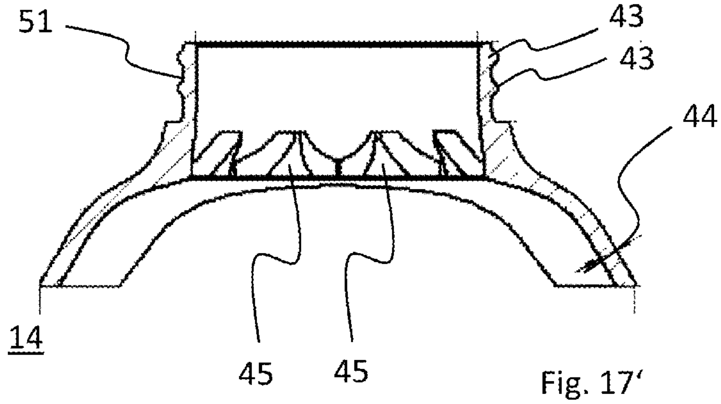

FIG. 15' to FIG. 17' show the vial holder of the connector, with FIG. 15' being a perspective representation, FIG. 16' a top view and FIG. 17' a sectioned view.

Figure 18:
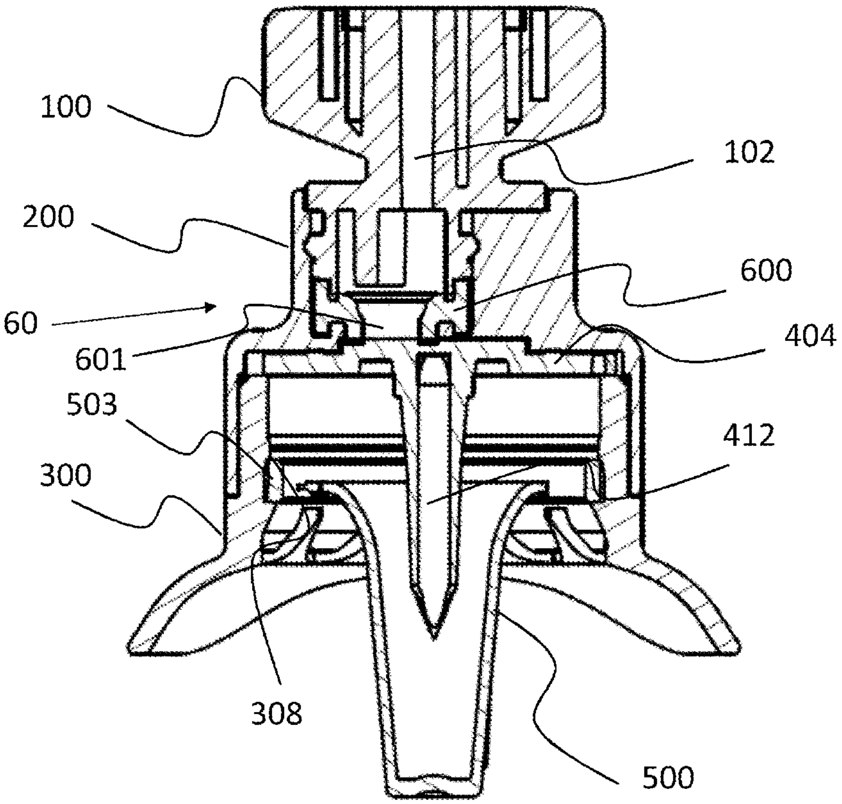
Figure 18A:
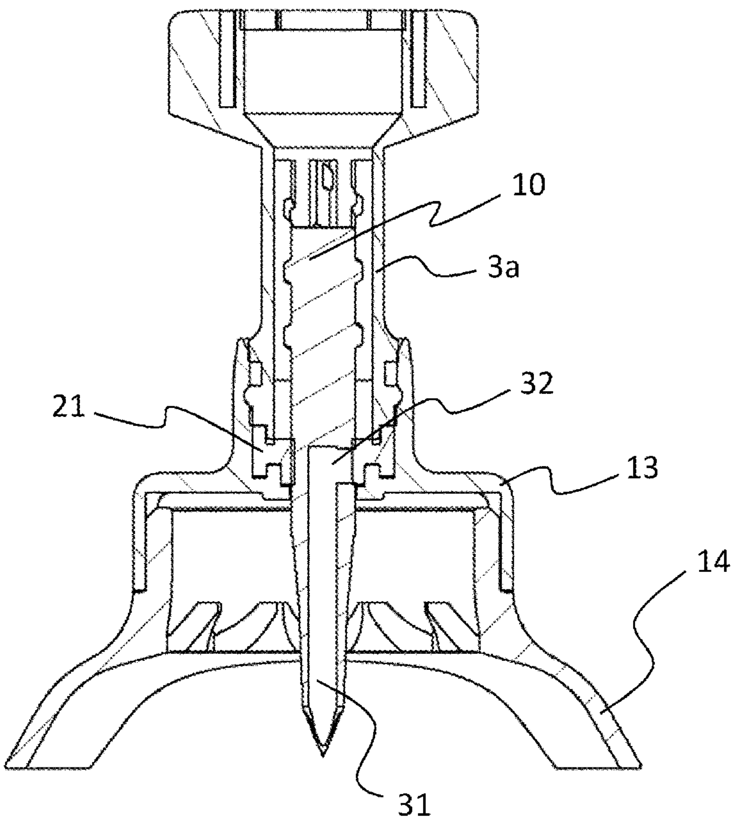
Figure 18B:
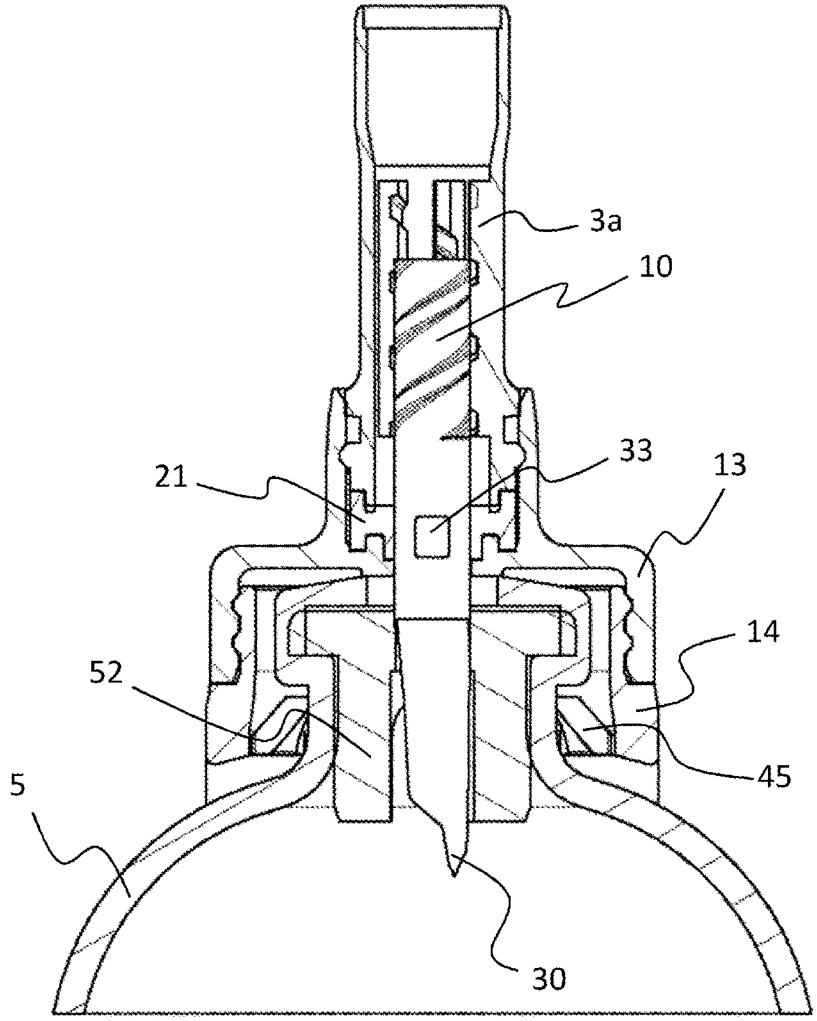

FIGS. 18*a'* and 18*b'* show a sectioned view of the connector in the closed state without (FIG. 18*a'*) and with connected vial (FIG. 18*b'*).

FIG. 19' is a sectioned view of the connector in open state with a connected vial.

DETAILED DESCRIPTION OF THE DRAWINGS

FIG. 1 to FIG. 24 show a first embodiment of the invention, in which the vial 90 is arranged on a rotatable disc 404.

FIG. 1 is a representation of a medical packaging in the form of an infusion bag 70, to which a vial 90 will be connected.

The infusion bag 70 consists of foils welded together via the transverse weld seams 71 and longitudinal weld seams 72. The infusion bag 70 has a hanger 73 for attaching the infusion bag 70 to a stand.

The infusion bag 70 further comprises at least one withdrawal port 80.

The withdrawal port 80 consists of a lower part 81 welded into the transverse weld seam 71 of the infusion bag 70 and an upper part 82 which has a break-off part 83. Additionally, the withdrawal port 80 also comprises a septum which is fixed, preferably in a clamped manner, between the lower part 81 and the upper part 82 (not represented in the figures).

After breaking off the break-off part 83, the septum of the withdrawal port 80 can for example be pierced with a spike of a transfer set in order to thus withdraw the infusion liquid and supply it to a patient.

Additionally, the infusion bag 70 comprises a further port which is designed as a connector 60, with which a fluid connection can be established to a vial 90. The connector 60 comprises a lower part 100 which is welded in the region 74 of the weld seam 71 in this embodiment. Further details on the connector 60 will be explained on the basis of the following figures.

A further access or port is provided by the connector 60 via which liquid can be transferred from the vial 90 to the infusion bag 70. Furthermore, it is also possible to first transfer liquid from the infusion bag 70 to the vial 90, for instance in order to dissolve a solid, for example powder, active ingredient present there and to then transfer the solution produced back to the infusion bag 70.

The vial 90 comprises a cap 91, which is in particular designed as a beaded metal cap or as a snap-on closure and which comprises a septum which can be pierced by the spike of the connector 60.

In order to connect the vial 90 to the infusion bag 70, the cap 500 is first removed from the connector 60 in this exemplary embodiment.

The vial 90 with the cap 91 in front is then pushed into the connector 60, with the funnel-shaped or in particular cup-shaped configuration of the connector 60 simplifying the centered introduction.

The septum of the vial 90 is in this case pierced by the spike 401 of the connector 60 and the cap 91 of the vial 90 or the head of the vial 90, which is designed in a collar shape, locks in the connector 60.

A fluid connection is then opened between the vial 90 and the infusion bag 70 by rotating the vial 90, by way of which the spike 401 is also rotated. Additionally, the connector 60 comprises a valve which can preferably be opened and closed via a rotational movement.

FIG. 2 is a perspective representation of the connector 60 without infusion bag 70.

The lower part 100 of the connector 60 comprises in this exemplary embodiment a connecting section for the infusion bag 70 which is designed in particular as a weld-in section 101. The weld-in section 101 is designed in the shape of a shuttle in this exemplary embodiment. A channel 102 leads into the infusion bag 70 through the lower part 100 of the connector 60.

The lower part 100 is connected to the middle part 200, with the middle part 200, for its part, being connected to the vial holder 301 of the upper part 300.

Furthermore, the lower part 100 of the connector 60 can also comprise a connection piece for connecting to a port, instead of a connecting section to weld into the infusion bag 70 according to another embodiment. In this exemplary embodiment not represented here, the connector 60 is designed as a separate adapter for a port. The connection piece of the connector 60 can for example be designed as a preferably male Luer connector or Luer lock connector.

FIG. 3 is a perspective exploded representation of the connector 60 represented in FIG. 2.

The housing of the connector 60 comprises a lower part 100, a middle part 200 and an upper part 300.

The lower part 100 and the middle part 200 and the middle part 200 and the upper part 300 are preferably each locked together. The connector 60 can be mounted without a weld or adhesive connection.

The seal 600 is inserted between the lower part 100 and the middle part 200.

The spike carrier 400 with the spike 401 is inserted between the middle part 200 and the upper part 300 in the assembled state.

In the assembled state, the cap 500 is inserted from below into the upper part 300, which is designed as a break-off part and therefore serves as a tamper-evident closure.

The upper part 300 comprises the funnel-shaped vial holder 301 which facilitates the insertion of the vial 90. The vial 90, once inserted, is locked in the vial holder 301 and cannot be removed again.

The middle part comprises windows 201, 202, on the basis of which the user discerns whether the connector 60 is open or closed.

To open and close the connector 60, the spike carrier 400 is rotated by means of the spike 401 connected to the vial 90, in this exemplary embodiment e.g. by roughly a quarter turn.

In this perspective view, a stop 207 for the spike carrier 400 is discernible on an inner wall of the middle part 200, via which the rotational movement of the spike carrier 400 is limited.

FIG. 4 is a perspective view of the spike carrier 400 with the spike 401.

The spike carrier 400 comprises a disc 404 and forms a valve in cooperation with the seal 600 in order to at least open the connector 60.

The spike carrier 400 represented here is provided for an embodiment of a connector 60 in which the connector 60 can be opened and closed again.

This embodiment of the invention has the advantage of preventing medical liquid flowing back into the vial 90 while the medical liquid is being administered.

The disc 404 and the spike 401 are preferably designed as an integral plastic part, in particular plastic injection molded part.

The spike 401 runs conically to the tip 402. The tip 402 is preferably tapered in order to enable easy piercing of the septum in the vial 90.

The spike 401 comprises an indent 403 with respect to the tip 402 which preferably runs in a middle region of the spike 401. The lateral indent 403 facilitates the passage of liquid and also enables the vial 90 to be virtually completely emptied.

At the foot of the spike 401 are reinforcement bars 405 which reinforce the spike 401 at the border between the upper side of the disc 404 and the spike 401. The reinforcement bars 405 can also serves as a stop for the cap 91 of the vial 90 in the inserted state. The reinforcement bars run proceeding from a base of the spike 401 as bars which extend in a star shape along the upper side of the disc 404.

Furthermore, the spike 401 comprises radially extending ribs 414. The radially extending ribs 414 are in particular designed as fins proceeding from a front or middle region of the spike 401 which taper towards the front and enlarge radially in the direction of the disc 404.

Thus, the ribs 414 can be cut into the septum of the vial 90 and thus form a torsion-proof connection.

The torsion-proof connection formed in this way benefits from the fact that when the spike 401 is rotated with the spike carrier 400 it is not axially displaced. The ribs 414 therefore remain at one height when the connector 60 is opened. The septum of the vial 90 can be pushed as far as possible on the spike 401 when inserted into the connector 60. When the spike 401 is rotated, this maximally pushed-on position generally does not change.

The disc 404 further comprises at least one stop 406, in particular two stops 406, which limit the rotational movement of the spike carrier 400 with the spike 401 in cooperation with a stop 207 of the middle part 200. The at least one stop 406 of the disc 404 is designed as a radial step in the outer circumference of the disc 404.

Furthermore, the disc 404 comprises a radially outwardly extending indicator 407 which is to be seen in the closed state through a window 201 and in the open state through another window 202 of the middle part 200 of the connector 60.

The indicator 407, in order to improve its discernibility, preferably has a different color to the middle part adjoining the window(s) 201, 202.

The indicator 407 is designed in such manner that it protrudes into the windows 201, 202 designed as openings of the housing wall and springs back when the spike carrier 400 with the spike 401 is rotated.

Furthermore, a noticeable resistance can thus be provided by the indicator 407 in order to move the spike carrier 400 from one of the end positions (open or closed).

The indicator 407 can also be configured in such manner that there is an audible noise, in particular in the form of a click, when it is snapped into one of the windows 201, 202. It is thus signaled to the user optically and acoustically that the connector 60 is located for example in an open end position. An indentation **407*a* is also arranged in the outer circumference of the disc 404. The indentation 407*a* is (open) for the indicator point 202. In the closed state, the indentation 407*a* is offset towards the rear at the point 202** to better differentiate the difference in the position.

FIG. 5 is a top view of the underside of the spike carrier 400, i.e. on the side opposite the spike 401.

The two stops 406 restrict the rotatability of the spike carrier 400 with the spike 401 in both rotational directions, e.g. to roughly one quarter turn.

An opening 408, through which liquid can flow in the direction of the spike 401 in the open state, is located radially offset in relation to the rotational axis 415 of the spike 401. Thus, when the spike 401 is rotated, the opening 408 shifts around the rotational axis 415 and come into overlap with a channel 601 of the seal in an open state of the connector 60.

The indicator 407 is connected to springs 409 on both sides via arched sections 410 in the top view, with the springs 409 being connected to the disc 404. The indicator 407 springing radially inwards in this way is designed in such manner that, behind the springs 409, the indicator 407 and the arched section 410, there is a recessed region 416 in which the plate, which is formed by the disc 404, is recessed.

The indicator 407 and the springs 409 are thus formed by a remaining side wall of the disc 404. The springs 409 are in particular designed as leaf springs, which are formed by a remaining side wall of the disc 404 due to the recessed region 416.

The indicator 407 looks sideways from the ring formed by the disc 404 and can deflect into the windows 201, 202 of the middle part 200 in the end positions.

The indicator 407 is designed integrally with the rest of the spike carrier 400 here.

The tensions in the material during deflection are reduced by the arched sections 410 since the deformations can be divided over a longer material section.

As represented in the longitudinal sectioned view according to FIG. 6, the opening 408 merges into the spike 401 via the channel 411 running transverse to the channel 412 of the spike 401. The channel 411 can open into the channel 412 of the spike 401 in particular at an angle of 30° to 60°.

The opening 408 is arranged on the disc 404 radially offset in relation to the rotational axis 415 through the transversely running channel 411.

The channel 412 of the spike 401 preferably runs coaxially to the rotational axis of the spike carrier 400. The vial 90 connected to the spike 201 is therefore subject to substantially only a rotational movement around its own central axis when the connector 90 is opened.

The disc 404 also comprises a rotary disc 413 in this exemplary embodiment. The rotary disc 413, within which the opening 408 is located, protrudes as a circular plate and, in the assembled state, sits in the holder 211 of the middle part 200 (see FIG. 8). In a closed state of the connector 60, the top surface of the rotary disc 413 rests tightly on the seal 600 and thus closes the channel 601 in the seal 600. By rotating the spike 401, the opening 408 is brought into overlap with the channel 601 of the seal. As a result, liquid can flow via the channel 412 of the spike 401 through the opening 408 into the infusion bag 70 (or vice versa).

FIG. 7 is a perspective view of the middle part 200. The middle part 200 consists in this exemplary embodiment of a coupling section 203 for the upper part 300 and a coupling section 204 for the lower part 100.

The coupling section 204 for the lower part 100 has a smaller diameter than the coupling section 203 for the upper part 300.

The coupling section 204 comprises a seal holder 205 for the seal 600. The seal holder 205 is provided with a structured wall, in particular with fluting or toothing in this exemplary embodiment which causes a positive-locking connection with the lower part 100 and/or the seal 600 and therefore provides a torsion-proof connection.

The seal holder 205 is arranged radially offset in relation to the rotational axis 415 of the spike 401 or of the spike carrier 400.

In the exemplary embodiment represented here, a recess 206, which can have in particular a sickle-like shape, is located adjoining the seal holder 205 in the coupling section 204. The recess 206 primarily serves to save material. It is understood that the recess 206 can therefore also be dispensed with.

As represented in the axial sectioned view of the middle part 200 according to FIG. 8, the groove 209 formed as a ring groove is located adjoining the seal holder 205, into which ring groove the lower part 100 is locked with a corresponding bar 105 (see FIG. 10).

At the front side, the seal holder 205 comprises an axially extending ring groove 210 which serves as a positive-locking element for the seal 600.

The coupling section 203 for the upper part 300 with the vial holder 301 also comprises, in this exemplary embodiment, at least one groove 208, in particular two grooves 208 spaced apart from one another in order to lock with the coupling piece 303 of the upper part 300 via the at least one collar 304.

The disc 404 of the spike carrier 400 is located between the upper part 300 and the middle part 200 in the assembled state. The rotary disc 413 sits in the holder 211 of the middle part 200 in the assembled state.

The stop 207 delimits the rotation of the spike 401 in both rotational directions in cooperation with the stops 406 of the spike carrier 404. The open and the closed position of the connector 60 are defined by one of the stops 406 of the spike carrier 400 resting on the stop 207 of the middle part.

FIG. 9 is an axial sectioned view of the seal 600.

The seal 600 comprises an axial channel 601 for the passage of liquid.

At the front side, the seal 600 comprises a contact surface 602 for the disc 404 or, more specifically, for the rotary disc 413 which sits tightly on the seal 600 in the closed state. In contrast, the opening 408 of the rotary discs 413 overlaps with the channel 601 of the seal 600 in the open state.

Adjoining the contact surface 602, the seal 600 comprises an axially extending ring groove 603 such that adjoining this ring groove is formed a ring-shaped edge-side bar 604 extending axially forwards.

The edge-side bar 604 serves as a positive-locking element and sits in a ring groove 210 of the middle part 200 in the assembled state.

The bar 604 is set back with respect to the contact surface 602 for the spike carrier 400 or the rotary disc 413 of the spike carrier 400.

A ring-shaped edge-side bar 605 is also located on the side opposite the contact surface 602, said bar adjoining a holder region 606 for the lower part 100.

The lower ring-shaped, edge-side bar 604 and the upper ring-shaped, edge-side bar 604 together form a substantially T-shaped flange to securely fasten the seal in the connector 60.

Between the holder region 606 for the lower part 100 and the channel 601 is located a transition region 607, in which a horizontally running base of the holder region 606 merges in a stepped manner into the axially extending side wall of the channel 601.

FIG. 10 is a perspective view of the lower part 100.

The lower part 100 is locked with the ring-shaped bar 105 in the ring groove 209 of the middle part 200 in the assembled state.

In order to clamp the seal 600, the lower part 100 adjoining the bar 105 comprises a bar 104 and a ring 106 to engage into the holder region 606 of the seal 600. The front side of the bar 104 comes to rest on the upper side of the ring-shaped, edge-side bar 605 of the seal 600. Additionally, the bar 104 is provided in this exemplary embodiment with a structuring, in particular a fluting or toothing in order to cause, together with the fluting or toothing in the seal holder 205, a torsion-proof connection for the lower part 100 and the middle part 200 and/or the seal 600.

An axially forwards extending ring 106 is arranged in the assembled state adjoining the bar 104 in the holder region 606 of the seal 600 and thus presses the seal 600 in the seal holder 205.

A plate 103 present between the weld-in section 101 and the bar 106 closes the housing middle part 200 in the assembled state.

A weld-in section 101 preferably has a central axis which overlaps with the rotational axis 415 of the spike 401.

The seal 600 and therefore the coupling section formed by the bar 105 for locking is, in contrast, arranged radially offset in relation to the rotational axis 415.

One end of a channel 107 extending through the lower part 100 is located here radially offset in relation to the rotational axis 415 of the spike 401 or spike carrier 400.

FIG. 11 is a perspective view of the upper part 300 with the vial holder 301. The vial holder 301 comprises a cup-shaped or funnel-shaped section 302 to which the coupling piece 303 adjoins with the at least one, in particular the two, collars 304 for locking into the middle part 200. The at least one collar 304 locks in the groove 208, represented in FIG. 8, of the coupling section 203 of the middle part 200.

The vial holder 301 also comprises a plurality of clamping fingers 305 inclined in the insertion direction of the vial 90.

The upper part 300 is preferably secured in a torsion-proof manner with respect to the middle part 200. To this end, the upper part 300 can comprise e.g. at least one bar 306 running axially along the coupling piece 303 which engages into a corresponding axial groove 208 of the middle part 200.

As represented in the top view according to FIG. 12, the clamping fingers 305 taper inwards in their width from the external base. On the inside, they end in the represented embodiment in a tip 307. The external bases of the clamping fingers 305 each merge into one another via a substantially round section. The clamping fingers 305 are configured round, in particular substantially circular, between the tips 307.

As represented in the sectioned view along the line A-A from FIG. 12 according to FIG. 13, the clamping fingers 305 are inclined in the insertion direction by the angle α. The degree information mentioned in the general part of the description refers to the underside of the clamping fingers 305. The angle α by which the clamping fingers 305 are inclined in the insertion direction of the vial 90, is in particular between 40° and 60°.

As can be seen in particular in the perspective view according to FIG. 13, the thickness of the clamping fingers 305 tapers further by them being flattened both on their upper side and on their underside towards the tip 307.

The clamping fingers 305 grip onto the underside of the cap 91 or of the head of the vial 90. It is no longer possible to remove the vial 90, once connected to the connector 60, from the connector 60 in a non-destructive manner.

FIG. 14 is a perspective view of the cap 500 which serves as a tamper-evident seal for the connector 60.

The cap 500 comprises an axially extending spike cover 501.

The spike cover 501 is connected via bars 502 to a ring-shaped insert 503.

The ring-shaped insert 503 is locked in the assembled state behind a step 308 (see FIG. 18) of the upper part 300.

Thus, the spike cover 501 can be removed from the insert 503 by it breaking off at the bars 502.

With reference to FIG. 15 to FIG. 17, an alternative embodiment variant of the first embodiment of the invention is explained in which the spike 401 is secured in a torsion-proof manner such that the connector 60 can be opened by the user, but cannot be closed again.

With exception of the differences described below, this embodiment variant corresponds substantially to the embodiment represented with reference to FIG. 1 to FIG. 14.

FIG. 15 is a perspective view of the middle part 200.

Unlike the previously represented middle part 200, this middle part 200 has only a single window 202 via which the user recognizes that the connector 60 is open.

FIG. 16 is a top view of the underside of the middle part 200.

Unlike the previously represented embodiment variant, a plurality of locking hooks 212 are arranged on the side wall of the middle part 200.

The middle part 200 also comprises the stop 213 on which the stop 406*a* of the spike carrier 400 represented in FIG. 17 with the spike 401 rests in the fully closed state.

The first locking hook 212*a* acts like a stop of the middle part 200 for the second stop 406*b*.

The spike carrier 400 also comprises the deflecting hook 417, which slides past the locking teeth 212 via a sliding surface 418 when the spike 401 is rotated, deflects behind a locking tooth 212 in each case and thus forms a torsion-proof connection in cooperation with the locking teeth 212 which prevents the spike carrier 400 with the spike 401 turning backwards. With each locking of the deflecting hook 417 into one of the locking teeth 212, the spike carrier 400 is rotated further in such manner that it cannot be turned backwards again.

Lastly, the deflecting hook 417 locks in the window 202 in the fully open state.

In this case, the open end position can in turn be signaled by the hook 417 protruding into the window 202 and/or by an audible click when the hook 417 locks in the window 202.

The deflecting hook 417 forms a torsion-proof connection in the window 202 in the open state. The spike carrier 400 can no longer be twisted further in any direction in the open position of the connector 60 due to the stop 406*a* of the spike carrier 400 resting on the first locking hook 212*a* and due to the torsion-proof connection by way of the hook 417 locked into the window 202.

The connector 60 is now open and can no longer be closed.

FIG. 18 is an axial sectioned view of the connector 60 represented in FIG. 1 to FIG. 14 in its closed state.

The housing of the connector 60 comprises the lower part 100, the middle part 200 and the upper part 300.

The seal 600 is clamped in between the lower part 100 and the middle part 200, as previously mentioned, with the lower part 100 and the middle part 200 being locked together.

The spike carrier 400 with the disc 404 is located between the upper part 300, comprising the vial holder 301, and the middle part 200. In the state represented here, the channel 601 of the seal 600, which leads to the channel 102 of the lower part 100, is sealed by the disc 404, more specifically by the rotary disc 413 of the disc 404 represented in FIG. 6.

Therefore, no liquid can flow through the channel 412 of the spike 401 in the direction of the infusion bag 70 or vice versa.

The user can now break off the cap 500, more specifically, the spike cover 501 of the cap 500.

The cap 500 is locked with the insert 503 behind a step 308 of the upper part 300.

FIG. 19 shows the connector 60 in an axial sectioned view after the cap 500 is broken off and the spike 401 rotated. The rotation of the spike 401 has been caused in particular by a rotation of the connected vial 90 (not represented here). The spike 401 has been rotated since the spike 401 is pierced in the septum of the vial 90 in a torsion-proof manner.

The disc 404 of the spike carrier 400 has been twisted by rotating the spike 401 in such manner that the channel 411 with the opening 408 (see FIG. 6) overlaps with the channel 601 of the seal 600.

Liquid can now flow through the channel 412 of the spike 401 through the channel of the seal 601 and the channel 102 of the lower part 100 into the infusion bag 70 or vice versa. The fluid connection now extending through the connector 60 is symbolized by a dashed arrow.

It can also be discerned in this view that the channel 601 of the seal 600 is arranged radially offset in relation to the rotational axis 415 of the spike 401.

The weld-in section 101 preferably lies centrally on the rotational axis 415 of the spike. It is understood that the channel 102, which runs through the weld-in section 101, can, however, run laterally offset in relation to the rotational axis 415.

By aligning the rotational axis 415 corresponding to a central axis, preferably both of the lower part 100, of the middle part 200 and of the upper part 300, an overall symmetrical structure, when viewed from the outside, is provided in which the occurring torques are evenly absorbed by both halves of the weld-in section 101 when the spike 401 is rotated.

Owing to the rotating disc 403, the liquid is, however, conducted through the seal 600 laterally offset in relation to the rotational axis 415.

With reference to FIG. 20 to FIG. 29, another embodiment of the invention with respect to FIG. 1 to FIG. 14 is represented. Essentially, the differences with respect to the embodiment according to FIG. 1 to FIG. 14 are explained below.

With exception of the described differences, this embodiment can consequently be designed exactly as the embodiment represented with reference to FIG. 1 to FIG. 14.

Figure 20:
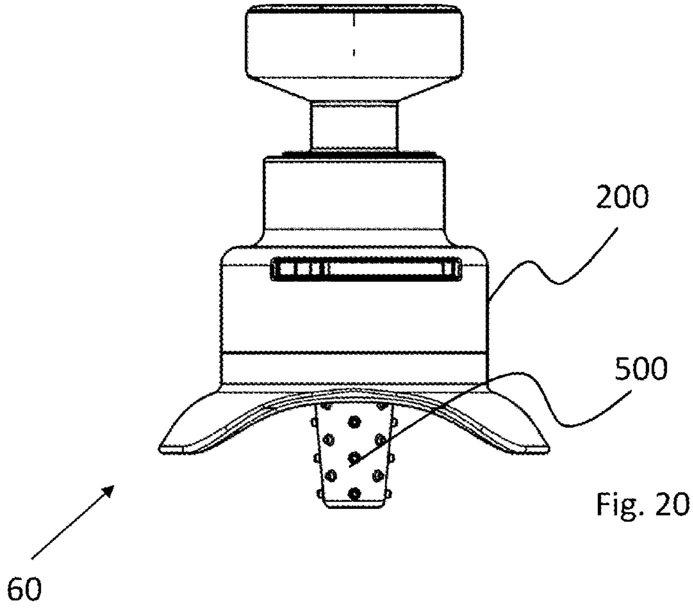

FIG. 20 is thus a view of the connector 60, which, based on the basic structure, corresponds to the embodiment according to FIG. 1 to FIG. 14 and has in particular the middle part 200 and the cap 500.

Figure 21:
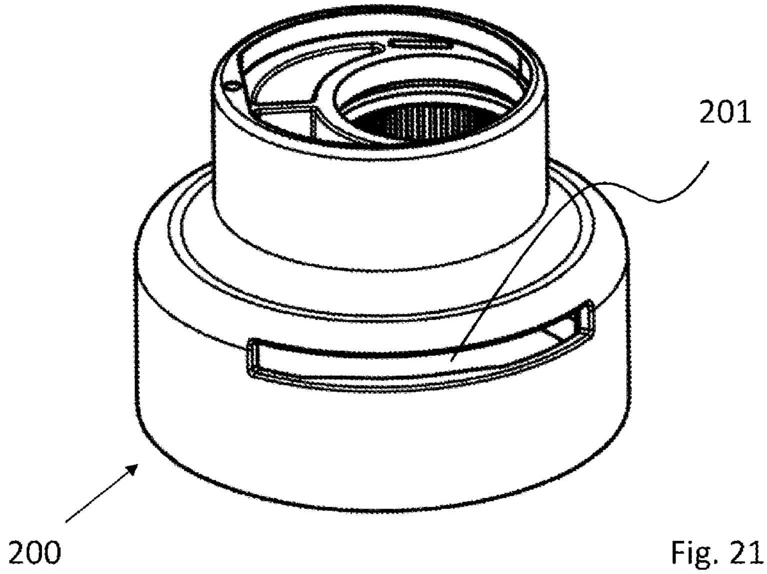

As represented in the perspective detailed view of the middle part 200 according to FIG. 21, the middle part 200 comprises only a single window 201. The window 201 can be designed in particular as a, here in sections, circumferential slot.

The indicator 407 therefore preferably does not lock in its end positions. The indicator 407 preferably comes to rest on the two ends of the window 201 in each case in its end positions.

Compared to the embodiment according to FIG. 1 to FIG. 14, this configuration has the advantage that resistance does not have to be overcome to allow the indicator 407 to spring back.

On the other side, reaching the end position can now be controlled visually in the case of the embodiment represented here.

Figure 22:
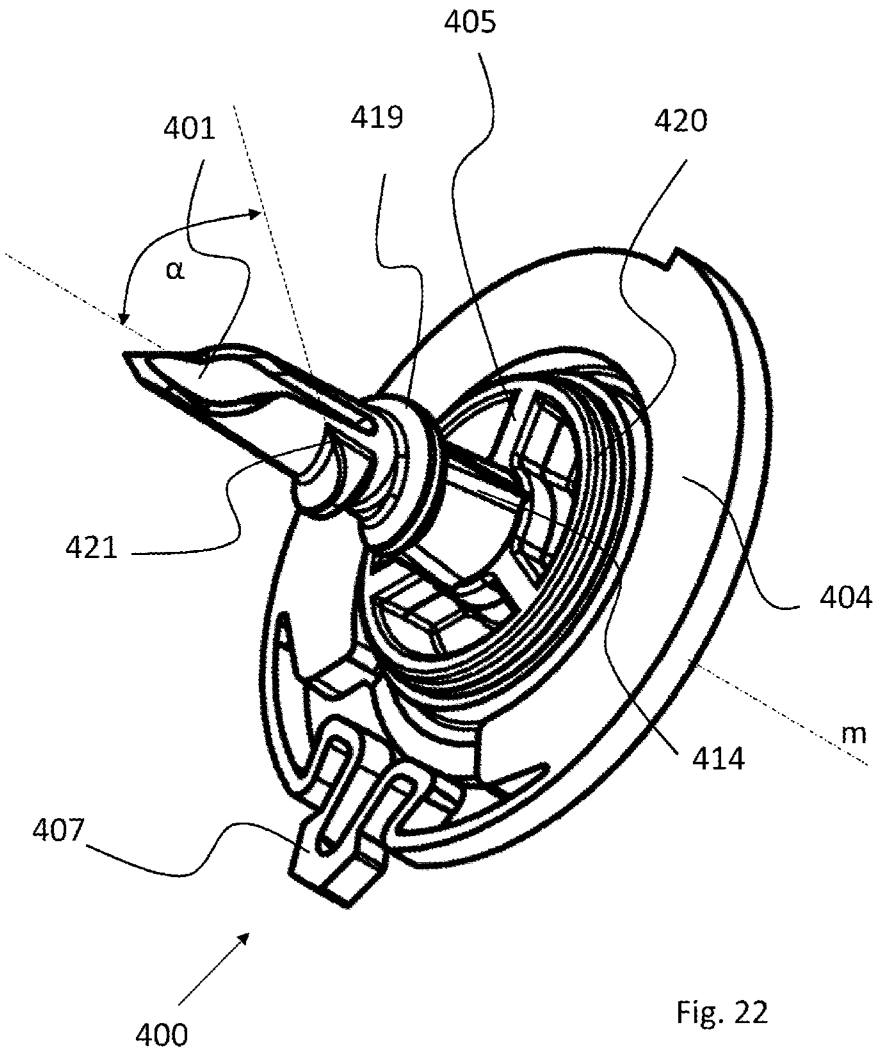

FIG. 22 shows in a perspective view the spike carrier 400 with spike 401.

As in the case of the embodiment according to FIG. 1 to FIG. 14, the spike carrier 400 comprises a disc 404 with an indicator 407.

The disc 404 also comprises, on the side of the spike 401, a ring 420 which acts as the rotary disc in the housing.

The spike carrier 400 thus comprises a disc 404 which is mounted on both sides in the installed state.

The reinforcement bars 405 extend inside the ring 420.

This facilitates a compact configuration since the spike 401 thus has to protrude less from the disc 404.

One difference of this embodiment is that the spike 401 has a partial section with a thread 419. The thread 419 is designed with one flight and preferably comprises fewer than two thread flights.

The front end of the thread 419 comprises a tip 421. The tip 421 is provided as a result of the tooth tip of the threaded tooth of the thread 419 changing direction by it performing a bend or by the tooth of the thread 419 having an end section towards the tip 421 in which the pitch of the thread 419 is increased. The tip 421 is aligned in particular at an angle $\alpha$ of 0° to 70°, preferably of 30° to 60°, in relation to the central axis m of the spike 401.

When the spike 401 is pierced into the septum, this causes the tip 421 of the thread 419 to pierce into the septum and thus the septum is pulled onto the thread 419. If the vial is rotated to open the connector, the thread 419 is initially screwed into the septum.

The bars 414 are located distally adjoining the thread 419 as a torsion-proof connection. In this region, the diameter of the spike 401 also increases further due to its conical shape.

Upon reaching the bars 414, the spike 401 then sits in a torsion-proof manner in the septum such that the disc 404 is also rotated during a further rotation and the connector 60, as represented with reference to FIG. 1 to FIG. 14, opens.

As the torsion-proof connection, the spike 401 comprises, in this exemplary embodiment, a plurality of, in particular three, ribs 414, which are arranged between the thread 419 and the distal end of the spike 401. In the open state of the connector, the septum of the vial 90 sits in this region, i.e. is thus slid by way of the thread 414 into the region with the torsion-proof connection.

The ribs 414 can taper in the radial direction. The thus formed wedge shape facilitates the sliding of the septum on the section with the torsion-proof connection.

Figure 23:
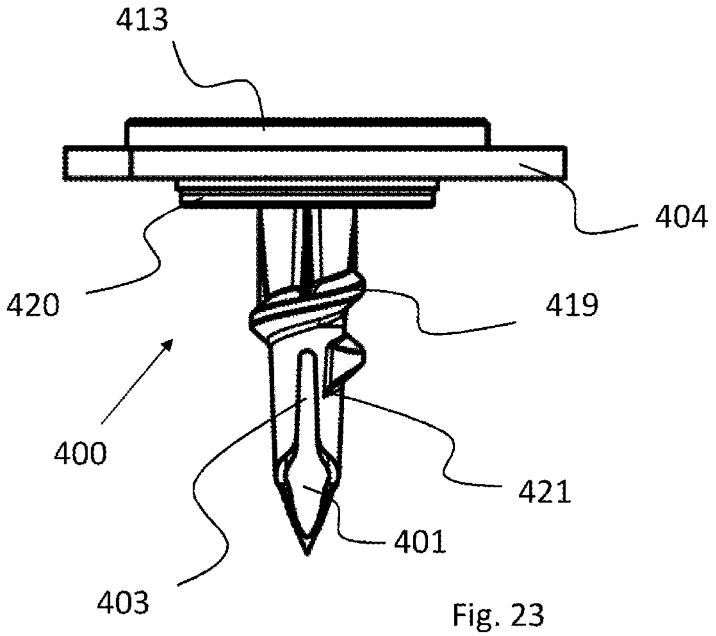

As represented in the side view according to FIG. 23, the disc 404 is mounted on both sides so as to be rotatable and, on one side, comprises the rotary disc 413 and, on the other side, the other rotary disc formed as a ring 420.

The indent 403 of the spike 401 preferably ends in front of or, as represented here, roughly at the height of the tip 421 of the thread 419. This ensures that the spike 401 can then only rotate when the septum is already tightly engaged with the spike 401. A torque can namely also be transferred by the thread 414 which can set the spike 401 into rotation under certain circumstances.

A further difference compared to the exemplary embodiment according to FIG. 1 to FIG. 14 is the configuration of the cap 500.

Figure 24:
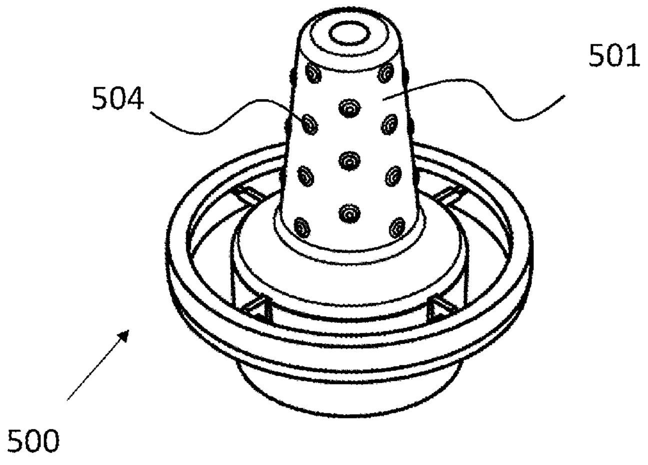

As represented in the perspective view according to FIG. 24, the spike cover 501 comprises a grip profiling 504 so that it can be better grasped and removed.

The grip profiling 504 is provided in this exemplary embodiment by a plurality of nubs.

The nubs run in axially aligned rows along the spike cover 501.

The rows are in this exemplary embodiment each arranged offset in relation to one another. This ensures that the user, wherever they grasp the spike cover 501, always engages with the non-slip profiling 504.

Figure 25:
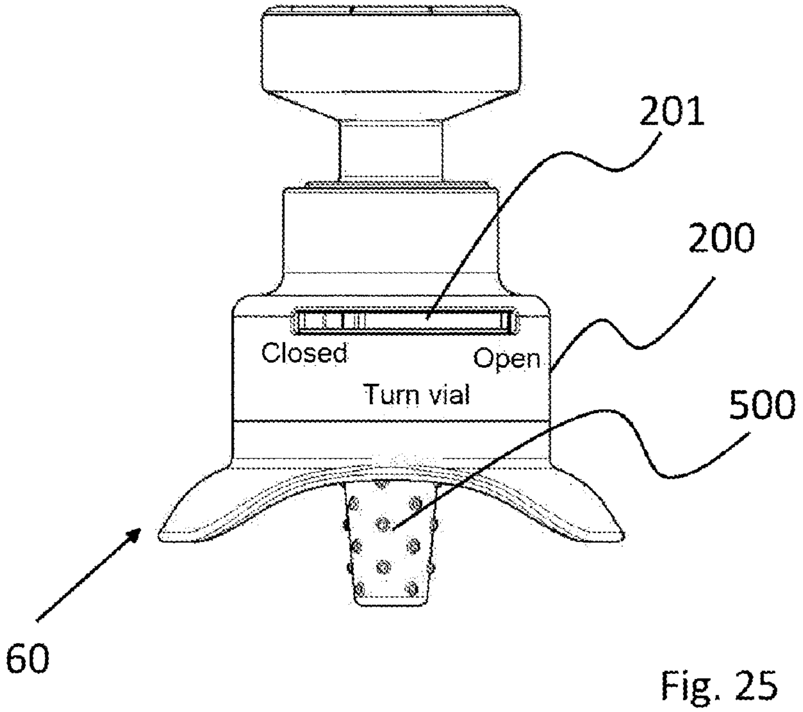
FIG. 25 shows a connector with added markings in order to indicate an open and closed state and that the connector can be moved from the one state into the other state through a rotational movement.
Figure 26:
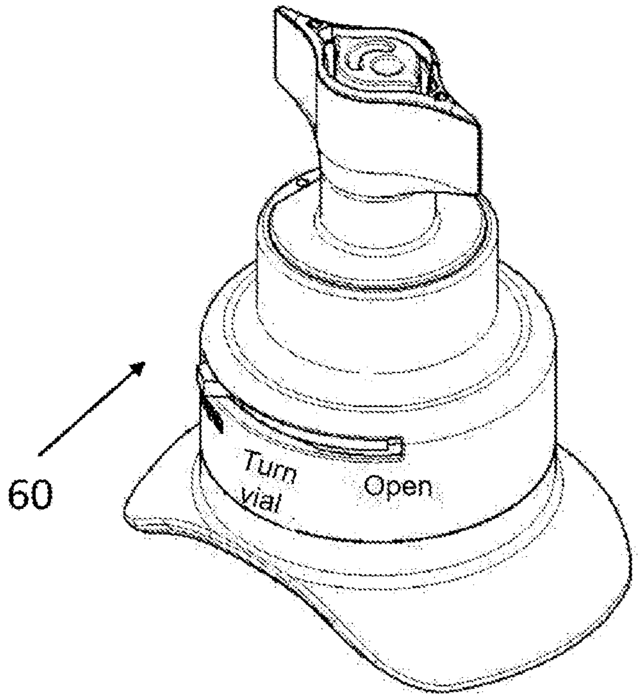
FIG. 26 is a perspective view of the connector from FIG. 25.

FIGS. 25 and 26 show the connector 60 from FIG. 20 once again with added markings. These markings indicate whether the connector 60 is in its open state ("open") or in its closed state ("closed"). These two markings are each positioned laterally on the window 201. Additionally, another marking ("turn vial") is added which indicates to the user that the connector 60 can be moved from one state into another state by rotating the vial 5.

Figure 27:
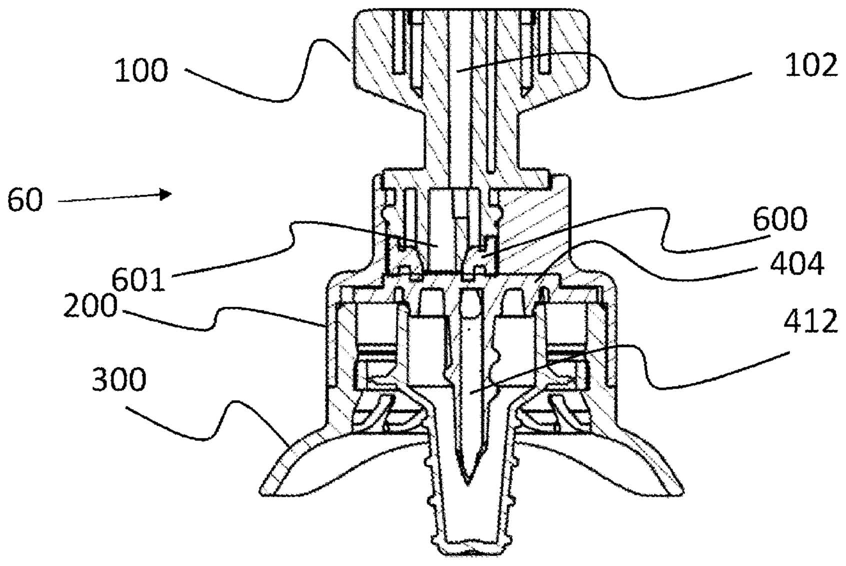
FIG. 27 and FIG. 28 are longitudinal sections of the connector in closed state.
Figure 28:
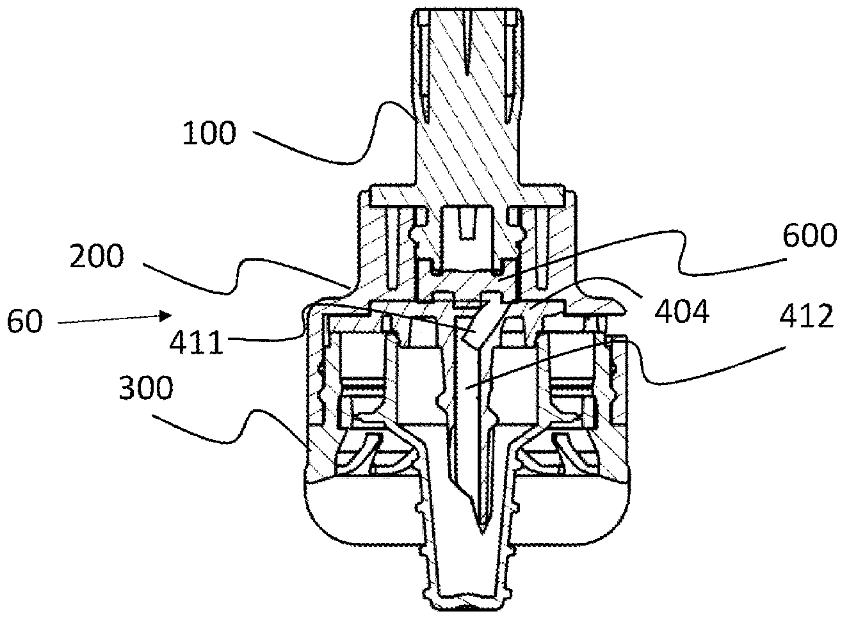

FIG. 27 and FIG. 28 are longitudinal sections of the connector 60 represented in FIG. 20 in its closed state.

With exception of the differences explained above, the configuration corresponds to the representation in FIG. 18.

The housing of the connector 60 according to this embodiment is also formed by the lower part 100, the middle part 200 and the upper part 300, with the seal 600 being clamped in between the lower part 100 and the middle part 200. The lower part 100 and the middle part 200 can be locked together.

The spike carrier 400 with the disc 404 is located between the upper part 300, comprising the vial holder 301, and the middle part 200.

The channel 601 of the seal 600, which leads to the channel 102 of the lower part 100, is sealed by the disc 404.

As represented in FIG. 28, the channel 411 extending transverse to the channel 412 does not overlap with the channel 601 of the seal 600.

The connector 60 is moved into the open state, with exception of screwing in the thread 419, in accordance with the representation according to FIG. 19.

FIG. 29 is a side view of another embodiment of a connector 60.

This connector 60 essentially corresponds, with exception of the differences explained below, to the preceding embodiments, and can thus have all features described above in particular with exception of the differences.

In particular, this embodiment also comprises an upper part 300, a middle part 200 and a lower part 100. The window 201 corresponds to the embodiment described above.

In the case of this embodiment, as already discussed above, the indicator 407 can be rotated up to two end positions of the window 201 and preferably does not lock in an individual window in its end position. This embodiment variant facilitates simple opening and closing of the connector 60.

The open position is represented in the drawings. The indicator 407 is thus located at the position marked "open".

FIG. 30 is a side view of the connector 60 from another direction.

FIG. 31 is a sectioned view along the line A-A of FIG. 29.

As also in the case of the preceding embodiments, the seal 600 is clamped in between middle part 200 and upper part 300.

The configuration of middle part 200, upper part 300 and seal 600 can be the same as the preceding embodiments.

FIG. 32 is a sectioned view along the line B-B of FIG. 30.

Also in the case of this embodiment, the opening of the connector and the fluid channel formed in the process corresponds to the representation in FIG. 19. Reference can thus be made to FIG. 19.

In particular, the opening 408 of the channel 411, which merges obliquely into the channel 412 of the spike 401, is brought into overlap with the channel 601 of the seal 600 such that a fluid connection is provided.

This is carried out in accordance with the preceding embodiments by rotating the spike carrier 400 with the spike 401. The fluid connection is symbolized by a dashed line.

FIG. 33 is a perspective view of the spike carrier 400 with spike 401. In accordance with the embodiment represented in FIG. 1 to FIG. 14, the spike 401 does not comprise a thread, which is screwed into the septum of the vial 90.

Unlike the embodiments represented previously, the tip 402 of the spike 401 is provided with a reinforcement 422.

The wall of the spike 401 widens radially outwards in the region of the tip 402 such that the tip 402 is arranged on a thickened wall arranged laterally offset.

The thickness of this reinforcement 422 pointing radially laterally outwards is reduced below the opening of the channel 412 of the spike 401.

In the section 423, which is arranged between the ribs 414, acting as a torsion-proof connection, and the reinforcement 422, the spike 401 preferably merges into a round outer contour. In this way, an optimal seal effect is already ensured before the spike carrier 400 with the spike 401 can be rotated by means of the vial 90 in order to open the fluid connection.

In the case of this embodiment, a sufficiently stable spike 401 can be easily provided, which can easily pierce, has a good seal effect and also provides a torsion-proof connection in cooperation with the seal 600 in order to use the vial 90 as a drive for the spike 401 together with the spike carrier 400.

The configuration of the indicator 407 corresponds to the representation according to FIG. 22, to whose description reference is made in full. The indicator 407 is arranged so as to be resilient in particular in a radial direction.

FIG. 34 is a side view of the spike carrier 400 with spike 401.

FIG. 35 is a sectioned view along the line C-C of FIG. 34, i.e. a central longitudinal section.

The wall thickness of the spike 401 increases in the region of the reinforcement 422.

In particular, the wall thickness $d_{max}$ in the region of the reinforcement 423 is at its thickest point at least 1.5, preferably at least 1.8 times as great as the wall thickness of the wall of the spike 401 at its thinnest point $d_{min}$.

The reinforcement 423 runs in the proximal direction.

The spike 401 has in roughly the center a circular outer contour, before the ribs 414 adjoin in a conical section of the spike 401.

Also in the case of this embodiment of the invention, the disc 404 is mounted on both sides and namely on the distal side via the ring 420 and on the proximal side via the rotary disc 413.

As represented in the top view of the tip 402 of the spike 401 together with the spike carrier 400 according to FIG. 36, the ring 420 is connected via the reinforcement bars 405 to the spike 401.

The reinforcement 422 can extend around the circumference of the spike 401 by an angle β of less than 90°, preferably less than 60° and/or of over 20°, preferably over 30°.

FIG. 37 is a flow diagram of an exemplary embodiment of a method according to the invention, which can be carried out with all embodiments of a medical packaging, in particular also with the infusion bag 70 represented in FIGS. 1 to 36 and/or with the infusion bag 1 represented in FIGS. 1' to 19'.

Firstly, the vial is inserted into the vial holder of the connector. Due to the clamping fingers of the vial holder, the vial is now connected inseparably to the connector. The spike has pierced the septum of the vial upon insertion. The inseparable connection prevents unintended release of the vial. In particular, this prevents the content from coming out of the vial and/or the infusion bag towards the outside due to the vial being released.

The user then rotates the vial to an end position. The septum of the vial rotates the spike along with it and thus opens a fluid connection between the medical packagings, in particular the vial and the infusion bag. The opened end position is preferably signaled to the user by an audible and/or noticeable snap-in.

The liquid from the vial can now flow into the medical packaging, e.g. the infusion bag, or, if the vial contains a solid, liquid can first flow out of the medical packaging into the vial such that the solid can be dissolved in the liquid.

Depending on the embodiment of the invention, the user can then rotate the vial back in the opposite direction such that the connector is sealed again. This prevents liquid flowing back into the empty vial.

In the case of another embodiment of the invention, the connector is locked in the open end position in such manner that it can no longer be closed.

Lastly, the user removes the cap of the withdrawal port and connects the medical packaging, for example the infusion bag, to a transfer system in order to administer the medical liquid.

The use of the connector according to the invention enables a simple and secure dosing of the substances contained in the vial.

FIG. 1' to FIG. 19' show a second embodiment of the invention in which the spike 10 has a lateral opening 33 and is pushed axially by a rotational movement.

FIG. 1' is a representation of a medical packaging in the form of an infusion bag 1, to which a vial 5 will be connected.

The infusion bag 1 consists of foils welded together via the weld seams 7 and 8. The infusion bag 1 has a hanger 9 for attaching the infusion bag 1 to a stand.

The infusion bag 1 further comprises at least one withdrawal port 4.

The withdrawal port 4 consists of a lower part 4*a* welded into the weld seam 7 of the bag 1 and an upper part 4*b* which has a break-off part 4*c*. Additionally, the withdrawal port 4 also comprises a septum which is fixed, preferably in a clamped manner, between the lower part 4*a* and the upper part 4*b* (not represented in the figures).

After breaking off the break-off part 4*c*, the septum of the withdrawal port 4 can for example be pierced with a spike of a transfer set in order to thus withdraw the infusion liquid and supply it to a patient.

The infusion bag 1 also comprises the port 2 which is designed as connector 3, with which a fluid connection can be established with a vial 5. The connector 3 comprises the lower part 3*a* which is welded in the region 6 of the weld seam 7 in this embodiment. Further details on the connector 3 will be explained on the basis of the following figures.

A further access or port 2 is provided by the connector 3 via which liquid can be transferred from the vial 5 to the infusion bag 1. Furthermore, it is also possible to transfer liquid from the infusion bag 1 to the vial 5, for instance in order to dissolve a solid, for example powder, active ingredient present there and to then transfer the solution produced back to the infusion bag 1.

The vial 5 comprises a cap 12, which is in particular designed as a beaded metal cap or as a snap-on closure and which comprises a septum 52 (see FIG. 19') which can be pierced by the spike 10 of the connector 3.

In order to connect the vial 5 to the infusion bag 1, the sealing foil 11 is first removed from the connector 3 in this exemplary embodiment. It is understood that, instead of the sealing foil 11, a cap or a combination of sealing foil and cap can also be provided (not represented).

The vial 5 with the cap 12 in front is then pushed into the connector 3, with the funnel-shaped or in particular cup-shaped configuration of the connector 3 simplifying the centered introduction.

The septum 52 of the vial 5 is in this case pierced by the spike 10 and the cap 12 of the vial 5 or the head of the vial 5, which is designed in a collar shape, locks in the connector 3 (see FIGS. 18*a*' and 18*b*').

A fluid connection is then opened between the vial 5 and the infusion bag 1 by rotating the vial 5, by way of which the spike 10 is also rotated. Additionally, the connector 3 comprises a valve which can preferably be opened and closed via a rotational movement.

FIG. 2' is a perspective representation only of the connector 3 (without infusion bag 1) with the vial 5 connected to the connector 3. The vial 5 is locked in the cup-shaped or funnel-shaped vial holder 14.

The lower part 3*a* of the connector 3 comprises in this exemplary embodiment a connecting section for the infusion bag 1 which is designed in particular as a weld-in section 18. The weld-in section 18 is designed in the shape of a shuttle in this exemplary embodiment. A channel 17 leads into the infusion bag 1 through the lower part 3*a* of the connector 3.

The lower part 3*a* is connected to the middle part 13, with the middle part 13, for its part, being connected to the vial holder 14. The middle part 13 and the vial holder 14 can also be designed integrally in another embodiment not represented.

Furthermore, the lower part 3*a* of the connector 3 can also comprise a connection piece for connecting to a port, instead of a connecting section to weld into the infusion bag 1, according to another embodiment. In this exemplary embodiment not represented here, the connector 3 is designed as a separate adapter for a port. The connection piece of the connector 3 can for example be designed as a Luer connector or Luer lock connector.

FIG. 3' is a side view of the connector 3, whose housing consists of the lower part 3, the middle part 13 and the vial holder 14. The housing of the connector 3 is thus designed in this exemplary embodiment in three parts.

The coupling section 19 is located between the lower part 3*a* of the connector 3 and the middle part 13. The coupling section 15 is located between the middle part 13 and the vial holder 14.

The three housing components can be locked together in particular, as will be explained in detail below.

The coupling section 15 between the middle part 13 and the vial holder 14 has a larger diameter here than the coupling section 19 between the lower part 3*a* and the middle part 13, since the coupling section 15 is adapted to the larger vial holder 14.

The spike 10 is arranged inside the housing. It is designed as a hollow needle, preferably made of plastic and protrudes into the vial holder 14 designed in sections in a funnel-shape or cup-shape.

The vial holder 14 comprises an edge-side recess 16 in the exemplary embodiment. The recess 16 enables the user to see the entire inner volume of the (transparent) vial 5. In this way, they can check for example whether the vial 5 is completely empty or whether the active ingredient is completely dissolved.

FIG. 4' is a perspective exploded representation of the components of the connector 3. The components of the connector 3 comprise in this exemplary embodiment the lower part 3*a*, the spike 10, the seal element 21, the middle part 13 and the vial holder 14.

The lower part 3*a* of the connector 3 with the channel 17 comprises the weld-in section 18 and, on the opposite side, the coupling section 19 of the lower part 3*a* to the middle part 13.

The coupling section 19 of the lower part 3*a* is locked with the head piece 20 of the middle part 13 in the assembled state.

The seal 21, which has the passage 25 for the spike 10, is inserted between the lower part 3*a* and the middle part 13. The seal element 21 serves both to seal the infusion bag 1 and, in cooperation with the spike 10, as a valve component.

The spike 10 comprises the thread 23, which sits in a thread 28 of the lower part 3*a* in the assembled state (see also FIG. 6'). The thread 23 of the spike 10 is preferably designed as an outer thread and the thread 28 of the lower part 3*a* as an inner thread.

The coupling section 15 of the middle part 13 is, for its part, in turn locked onto the connecting section 24 of the vial holder 14. As already previously mentioned, the middle piece 13 and the vial holder 14 can also be designed integrally in an exemplary embodiment not represented here.

FIG. 5' is a perspective view of the lower part 3*a* which has the coupling section 19 to the middle part 13 and the weld-in section 18. FIG. 6' is an axial sectioned view of the lower part 3*a* and FIG. 7' is a top view of the lower part 3*a* (viewed from the infusion bag 1).

As represented in the longitudinal sectioned view according to FIG. 6', the connecting section 19 comprises the collar 26 which is locked in a corresponding groove 39 of the middle part 13 (see FIG. 14').

The coupling section 19 also comprises a toothing 27 which, in the assembled state, engages into a toothing 36 of the middle part 13 (see also FIG. 14') and forms a torsion-proof connection.

The front end 40 of the lower part 3*a* engages into the seal element 21 in its assembled state. The front end 40 of the lower part 3*c* comes to rest on the upper side of the seal element 21 next to the ring 34 of the seal element 21.

The thread 28 of the lower part 3*a* is, as represented in particular in FIG. 7', designed segmented. In this exemplary embodiment, the thread 28 comprises five segments.

Between the segments of the thread 28, axially extending recesses 50 are in each case provided which, in the open state of the connector 3 in cooperation with the spike 10, form at least one axially extending channel for the passage of liquid.

FIG. 8' shows on the left a first side view, in the center a second side view rotated by 90° and on the right additionally a perspective view of the spike 10. The spike 10 is designed in one embodiment made of plastic, for example made of polycarbonate. The spike 10 comprises the piercing section 29. This piercing section has a tip 30.

Continuing from the tip 30, a lateral indent 22 protrudes into the side wall of the spike 10 which ends inside the piercing section 29. In this way, the piercing of the septum of the vial 5 is, on the one hand, facilitated. On the other hand, a large cross-section is thus provided for the passage of liquid.

The spike 10 comprises a lateral opening 33 between the thread 23 and the piercing section 29 for the passage of liquid. The lateral opening 33 is sealed off by the seal 21 in the assembled and sealed state of the connector 3 (see FIGS. 18*a*' and 18*b*).

The spike 10 comprises here a two-flight thread 23 which has recesses 49 designed as a flattened portion of the threaded teeth in this exemplary embodiment. These recesses 49 are arranged axially behind one another.

In the open state of the connector 3, the recesses 49 overlap at least in sections with the recesses 50 of the thread 28 of the lower part 3*a* such that at least one axially extending channel is formed for the passage of liquid.

FIG. 9' is an axial sectioned view of the spike 10. The spike 10 is designed at least in sections as a hollow needle.

The piercing section 29 of the spike 10 comprises an axially extending channel 31, which, in the middle region of the spike 10, merges into a channel 32 extending towards the side, preferably radially, by way of which the lateral opening 33 is formed. The axially extending channel 31 and the radially extending channel 32 together form the channel or passage for transferring the liquid from the vial 5 into the infusion bag 1 or from the infusion bag 1 into the vial 5.

As represented in the top view of the tip 30 of the spike 10 according to FIG. 10', the piercing section 29 of the spike 10 is at least in sections not round. The piercing section 29 of the spike 10 is preferably at least in sections polygonal, in particular trapezoidal. As a result when the spike 10 is pierced in the septum of the vial 5, a torsion-proof connection is provided.

FIG. 11' is a perspective view of the seal element 21 which is made up of an elastic material. The seal element 21 comprises a central passage 25, whose side wall 48 tightly surrounds the spike 10 in the assembled state. The side wall 48 also seals off the lateral opening 33 of the spike 10 in the sealed state.

The seal element 21 comprises in this exemplary embodiment on its upper side and/or its underside (not represented in the figures) radial bars 47 which can also serve in particular as a torsion-proof connection. Since the seal element 21 is, however, fixedly clamped between the lower part 3*a* and the middle part 13, the bars 47 can be dispensed with, if required.

As represented in the sectioned view according to FIG. 12', the seal element 21 comprises an edge-side ring 34, which forms a circumferential T-shaped section of the seal element 21 rotated by 90°. In the assembled state, this ring 34 is secured on one side in a positive-locking manner in a front, ring-shaped groove 37 of the middle part 13 (see FIG. 14'). On the opposite side, the ring 34 is secured between the front end 40 of the lower part 3*a*, which engages into the seal element 21, and the head piece 20 of the middle part 13 such that a positive-locking connection is present on both sides of the seal element. An inner flange 35 of the seal element 21 extending in the direction of the middle part 13 engages into the ring-shaped section 38 of the middle part 13 (see also FIGS. 14' and 18 and 19).

In this way, the seal element 21 is securely fixed between the lower part 3*a* and the middle part 13, without there being the danger of it being pushed out.

FIG. 13' is a perspective view of the middle part 13 which comprises the coupling section 15 for the vial holder 14 and the head piece 20 for insertion of the lower part 3*a*. FIG. 14' is a corresponding sectioned view of the middle part 13.

The head piece 20 is designed as a coupling section 41 for inserting the coupling section 19 of the lower part 3*a*. To this end, the head piece 20 comprises the groove 39 in which, in the assembled state, the collar 26 of the lower part 3*a* is locked (see also FIG. 6' and FIGS. 18*a*'/*b*' and 19'). The head piece 20 is provided with a toothing 36 on the inside below the radial groove 39 in which the collar 26 of the lower part 3*a* locks. The seal element 21 sits in the region of the toothing in the assembled state.

The toothing 36 acts, on the one hand, as a torsion-proof connection for the seal element 21, which is compressed and thus pressed into the toothing 36.

On the other hand, adjoining the radial groove 39, in which the collar 26 of the lower part 3*a* locks, the toothing 27 of the lower 3*a* engages into the toothing 36 of the middle part 13 such that the lower part 3*a* is secured in a torsion-proof manner with respect to the middle part 13 by the toothing 36 of the middle part 13.

The front ring-shaped groove 37 serves, as previously described, as a positive-locking element for the circumferential ring 34 of the seal element 21. The flange 35 of the seal element 21 engages into the inner ring-shaped section 38 of the middle part 13.

The coupling section 15 comprises, in this embodiment, two circumferential grooves 42, into which each collar 43 of the vial holder 14 is locked (see FIG. 15').

FIG. 15' is a perspective view of the vial holder 14. The vial holder 14 comprises a cup-shaped or funnel-shaped section 44 to which the coupling piece 51 adjoins with the two collars 43 for the middle part 13.

The vial holder 14 also comprises a plurality of clamping fingers 45 inclined in the insertion direction of the vial 5.

As represented in the top view according to FIG. 16', the clamping fingers 45 taper inwards in their width from the external base. On the inside, they end in the represented embodiment in a tip 46. The external bases of the clamping fingers 45 each merge into one another via a substantially round section. The clamping fingers 45 are configured round, in particular substantially circular, between the tips 46.

As represented in the sectioned view according to FIG. 17', the clamping fingers 45 are inclined in the insertion direction by the angle α. The degree information mentioned in the general part of the description refers to the underside of the clamping fingers 45. The angle α by which the clamping fingers 45 are inclined in the insertion direction of the vial 5, is in particular between 40° and 60°.

As can be seen in particular in the perspective view according to FIG. 15', the thickness of the clamping fingers 45 tapers further by them being flattened both on their upper side and on their underside towards the tip 46.

The clamping fingers 45 grip onto the underside of the cap 12 or of the head of the vial. It is not possible to remove the vial 5, once connected to the connector 3, from the connector 3 in a non-destructive manner.

The FIGS. 18*a*' and 18*b*' show a longitudinal sectioned view of the entire connector 3 in a sealed state of the fluid connection. FIG. 18*a*' shows the connector 3 as such without the vial 5. FIG. 18*b*', in contrast, shows the connector 3 with the connected vial 5. The vial 5 is connected to the connector 3 in a snapped-in manner. In the connected state, the spike 10 of the connector 3 penetrates the septum 52 in the vial 5.

The spike 10 can be moved into an open and a closed end position by rotating the vial 5.

As a result, a valve is provided to open and close the fluid connection between the vial 5 and the infusion bag 1.

The vial 5 is rotated relatively with respect to the connector 3 to open and close the fluid connection. The fluid connection can also be opened and closed by rotating the connector 3 with respect to the vial 5.

As already mentioned above, FIGS. 18*a*' and 18*b*' show the closed end position of the spike 10. In this closed position, the lateral opening 33, which is formed by the radial channel 32 proceeding from the axial channel 31 of the spike 10, is sealed by the seal element 21. At the same time, the seal element 21 inserted between the lower part 3*a* and the middle part 13 seals the infusion bag 1 to the outside.

FIG. 19' shows, in a sectioned view, the vial 5 inserted into the connector 3, with the connector 3 now being located in its open state. The spike 10 penetrates the septum 52 of the vial 5. By rotating the vial 5, the spike 10 will be in an open end position of the connector 3.

By rotating the vial 5, the spike 10, which is locked in a torsion-proof manner in the septum 52 of the vial 5, will also be rotated. The spike 10 is rotated into the open end position as a result, because by rotating with the spike 10, the thread 23 of the spike 10, 23 is rotated in the thread 28 of the lower part 4*a*. As a result, the spike 10 is displaced in the axial direction in such manner that the radial channel 32 and therefore the lateral opening 33 are moved out of the seal element 21.

Via the lateral opening 33, a fluid can now flow past the thread 23 of the spike 10 via the channel 17 in the lower part 3*a* into the infusion bag 1 or also in the inverse direction.

As previously described, the segmented thread 28 of the lower part 3*a*, in cooperation with the recesses 49 in the thread 23 of the spike 10, allows a flow along an axial channel extending from the lateral opening 33 to the channel 17. The liquid thus flows axially along the thread 23 of the spike 10 after exiting the lateral opening 33 in the lower part 3*c*.

In the open state, the spike 10 preferably comes to rest in an end position. The fluid connection is also preferably resealable by the vial 5 being rotated back such that the spike 10 comes to rest in the end position represented in FIG. 18*b*'.

A convenient and easy to operate connector 3 for a vial 5, for example to connect a vial 5 to an infusion bag 1, could be easily provided by the invention.

LIST OF REFERENCE NUMERALS

1 Infusion bag
2 Port
3 Connector
3*a* Lower part of the connector 3
4 Withdrawal port
4*a* Lower part of the withdrawal port 4
4*b* Upper part of the withdrawal port 4
4*c* Break-off part of the withdrawal port 4
5 Vial
6 Region of the transverse weld seam 7
7 Transverse weld seam
8 Longitudinal weld seam
9 Hanger
10 Spike
11 Sealing foil of the connector 3
12 Cap of the vial 5
13 Middle part of the connector 3
14 Vial holder of the connector 3
15 Coupling section of the middle part 13 to the vial holder 14
16 Recess in the vial holder 14
17 Channel in the lower part 3*a* of the connector 3
18 Weld-in section of the lower part 3*a* of the connector 3
19 Coupling section of the lower part 3*a* to the middle part 13
20 Head piece of the middle part 13 of the connector 3
21 Seal element of the connector 3
22 Indent in the spike 10
23 Thread of the spike 10
24 Connecting section of the vial holder 14
25 Passage in the seal element 21 of the connector 3
26 Collar on the lower part 3*a* of the connector 3
27 Toothing of the lower part 3*a*
28 Thread in the inside of the lower part 3*a*
29 Piercing section on the spike 10
30 Tip of the spike 10
31 Axial channel in the spike 10
32 Radial channel in the spike 10
33 Lateral opening in the spike 10
34 Ring of the seal element 21
35 Flange of the seal element 21
36 Toothing of the middle part 13
37 Front groove in the middle part 13
38 Inner ring-shaped section in the middle part 13
39 Radial groove in the middle part 13
40 Front end of the lower part 3*a*
41 Coupling section of the middle part 13 to the lower part 3*a*
42 Groove in the middle part 13
43 Collar of the vial holder 14
44 Funnel-shaped or cup-shaped section of the vial holder
45 Clamping fingers of the vial holder 14
46 Tip of a clamping finger 45
47 Bar on the ring 34 of the seal element 21
48 Side wall of the passage 25 in the seal element 21
49 Recess (or flattened portion) of the thread 23 of the spike 10
50 Recess of the thread 28 in the lower part 3*a*
51 Coupling piece of the vial holder 14 to the middle part 13
52 Septum of the vial 5
60 Connector
70 Infusion bag
71 Transverse weld seam

72 Longitudinal weld seam
73 Hanger
74 Region of the transverse weld seam
80 Withdrawal port
81 Lower part
82 Upper part
83 Break-off part
90 Vial
91 Cap of the vial 90
100 Lower part
101 Weld-in section
102 Channel
103 Plate
104 Bar to engage into seal 600
105 Bar for locking into ring groove of the lower part
106 Ring for engaging into the transition region 607 of the seal
107 Channel
200 Middle part
201 Window
202 Window
203 Coupling section for upper part 300
204 Coupling section for lower part 100
205 Seal holder
206 Recess
207 Stop
208 Groove for locking the upper part 200
209 Groove for locking the lower part 100
210 Ring groove (for seal 600)
211 Holder for the rotary disc 413
212 Locking tooth
212*a* First locking hook
213 Stop
300 Upper part
301 Vial holder
302 Cup-shaped or funnel-shaped holder
303 Coupling piece
304 Collar
305 Clamping fingers
306 Bar
307 Tip
308 Step
400 Spike carrier with spike
401 Spike
402 Tip
403 Indent
404 Disc
405 Reinforcement bar
406 Stop
406*a* Stop
406*b* Stop
407 Indicator
407*a* Indentation
408 Opening
409 Spring
410 Arched section
411 Channel
412 Channel of the spike 401
413 Rotary disc
414 Rib (torsion-proof connection)
415 Rotational axis
416 Recessed region
417 Deflecting hook
418 Sliding surface
419 Thread
420 Ring
421 Tip of the thread 419
422 Reinforcement of the tip 402
423 Section between reinforcement and torsion-proof connection
500 Cap
501 Spike cover
502 Bar
503 Insert
504 Grip profiling
600 Seal
601 Channel
602 Contact surface for disc 404
603 Ring groove
604 Bar or flange
605 Bar or flange
606 Holder region for lower part 100
607 Transition region

The invention claimed is:

1. A connector for connecting a vial to an infusion bag, the connector comprising:
- a part that is configured to rotatably connect directly to the vial;
- a seal; and
- a spike carrier that interfaces with the seal, the spike carrier comprising a spike that is configured to pierce a septum of the vial to rotatably fix the spike carrier to the vial, wherein:
- the spike carrier, when the vial is rotatably connected to the part with the spike pierced through and rotatably fixed to the septum, is configured to rotate together with the vial and relative to the seal and to the part between an open position and a closed position,
- the spike carrier and the seal, when the spike carrier is in the open position, define a pathway for fluid communication between spike carrier and the seal, and
- the spike carrier and the seal, when the spike carrier in the closed position, prevent fluid communication between the spike carrier and the seal.

2. The connector of claim 1, wherein:
- the seal defines a channel,
- the spike carrier defines a channel, and
- the channel of the spike carrier and the channel of the seal overlap to define the pathway for fluid communication when the spike carrier is in the open position.

3. The connector of claim 2, wherein:
- the channel of the spike carrier defines an opening that faces the seal, and
- the opening is radially offset from a rotational axis of the spike carrier.

4. The connector of claim 3, wherein:
- the channel of the spike carrier is a first channel of the spike carrier and the spike carrier defines a second channel in fluid communication with the first channel,
- the second channel extends through the spike along the rotational axis of the spike carrier, and
- the first channel extends, at an angle relative to the rotational axis of the spike carrier, from the second channel to the opening that faces the seal.

5. The connector of claim 4, wherein:
- the spike comprises an indent that extends longitudinally parallel to the rotational axis, and
- the indent defines an opening of the second channel.

6. The connector of claim 2, wherein the spike carrier further comprises a disc rotationally fixed to the spike and from which the spike extends.

7. The connector of claim 6, wherein the spike carrier further comprises an indicator configured to visually indicate that the spike carrier is in the open position or the closed position.

8. The connector of claim 7, wherein the spike carrier further comprises a spring that resiliently connects the indicator to the disc.

9. The connector of claim 6, wherein the spike carrier comprises at least one reinforcement bar that reinforces a base of the spike with the disc.

10. The connector of claim 1, wherein the spike comprises at least one rib.

11. The connector of claim 1, wherein the spike comprises a reinforcement comprising a wall that is thicker than a wall of a tip of the spike.

12. The connector of claim 1, wherein the spike carrier rotates between an eighth of a turn and a full turn to transition between the closed position and the open position.

13. The connector of claim 1, wherein:
- the part is a first part and the connector further comprises a second part configured to connect to the infusion bag,
- the first part and the second part are locked together in a torsion-proof manner, and
- the spike carrier is between the first part and the second part, and is rotatable relative to the first part and the second part.

14. The connector of claim 13, wherein the first part is a vial holder that is configured to lock to the vial in a manner that permits relative rotation between the vial holder and the vial.

15. The connector of claim 14, wherein the vial holder comprises a plurality of clamping fingers inclined inwards in a direction along which the vial is configured to be inserted.

16. The connector of claim 14, wherein the vial holder has a funnel-shaped section configured to receive the vial.

17. The connector of claim 13, wherein:
- the connector further comprises a third part configured to connect to an opening of the infusion bag,
- the second part is locked together with the third part in a torsion-proof manner and is configured to connect to the infusion bag via the third part, and
- the seal is arranged between the second part and the third part.

18. The connector of claim 17, wherein the third part is a weld-in section configured to be welded to the infusion bag.

19. The connector of claim 17, wherein the third part is a Luer connection configured to connect to a complementary Luer connection of a port of the infusion bag.

20. The connector of claim 13, wherein:
- the connector further comprises a cap that comprises:
  - an insert secured to first part; and
  - a spike cover that covers the spike, and
- the spike cover is removably connected to the insert.

21. A connector for connecting a vial to an infusion bag, the connector comprising:
- a seal that defines a channel; and
- a spike carrier that defines a channel and that interfaces with the seal, the spike carrier comprising (i) a spike that is configured to pierce a septum of the vial and (ii) a disc rotationally fixed to the spike and from which the spike extends, wherein:
- the spike carrier is configured to rotate relative to the seal between an open position and a closed position,
- the spike carrier and the seal, when the spike carrier is in the open position, define a pathway for fluid communication between the channel of the spike carrier and the channel of the seal,
- the spike carrier and the seal, when the spike carrier in the closed position, prevent fluid communication between the spike carrier and the seal, and
- the spike and the disc are integral and are made of plastic.

22. A connector for connecting a vial to an infusion bag, the connector comprising:
- a seal that defines a channel;
- a spike carrier that defines a channel and that interfaces with the seal, the spike carrier comprising (i) a spike that is configured to pierce a septum of the vial and (ii) a disc rotationally fixed to the spike and from which the spike extends, the disc comprising a stop; and
- a part that is configured to connect to the infusion bag, the part comprising a stop, wherein:
- the spike carrier is configured to rotate relative to the seal between an open position and a closed position,
- the spike carrier and the seal, when the spike carrier is in the open position, define a pathway for fluid communication between the channel of the spike carrier and the channel of the seal,
- the spike carrier and the seal, when the spike carrier in the closed position, prevent fluid communication between the spike carrier and the seal, and
- the stop of the disc is configured to cooperate with the stop of the part to limit rotational movement of the spike carrier.

23. A medical packaging comprising:
- an infusion bag; and
- a connector fluidly connected to the infusion bag, the connector comprising:
  - a part that is configured to rotatably connect directly to a vial;
  - a seal; and
  - a spike carrier that interfaces with the seal, the spike carrier comprising a spike that pierces a septum of the vial to rotatably fix the spike carrier to the vial when the part is connected to the vial, wherein:
- the spike carrier, when the vial is rotatably connected to the part with the spike pierced through and rotatably fixed to the septum, is configured to rotate relative to the seal between an open position and a closed position,
- the spike carrier and the seal, when the spike carrier is in the open position, define a pathway for fluid communication between spike carrier and the seal, and
- the spike carrier and the seal, when the spike carrier in the closed position, prevent fluid communication between the spike carrier and the seal.

24. The medical packaging of claim 23, wherein:
- the medical packaging further comprises the vial connected to the part,
- the pathway defined by the spike carrier and the seal, when the spike carrier is in the open position, provides fluid communication between the vial and the infusion bag, and
- the spike carrier and the seal, when the spike carrier in the closed position, prevent fluid communication between the vial and the infusion bag.

25. The medical packaging of claim 24, wherein:
- the part is a first part and the connector further comprises a second part connected to the infusion bag,
- the first part and the second part are locked together in a torsion-proof manner, and
- the spike carrier is between the first part and the second part, and is rotatable relative to the first part and the second part.

26. The medical packaging of claim 25, wherein the first part is a vial holder that is configured to lock to the vial in a manner that permits relative rotation between the vial holder and the vial.

27. The medical packaging of claim 26, wherein the vial holder comprises:

a plurality of clamping fingers inclined inwards and clamped to the vial; and a funnel-shaped section that receives the vial.

28. The medical packaging of claim 25, wherein:

the connector further comprises a third part configured to connect to an opening of the infusion bag, the second part is locked together with the third part in a torsion-proof manner and is configured to connect to the infusion bag via the third part, and the seal is arranged between the second part and the third part.

29. The medical packaging of claim 28, wherein the third part is a weld-in section welded to the infusion bag.

30. The medical packaging of claim 25, wherein:

the connector further comprises a cap, that comprises:

an insert secured to first part; and a spike cover that covers the spike, and the spike cover is removably connected to the insert.

* * * * *